(12) United States Patent
Kandekar et al.

(10) Patent No.: US 8,711,737 B2
(45) Date of Patent: Apr. 29, 2014

(54) CROWD FORMATION BASED ON WIRELESS CONTEXT INFORMATION

(75) Inventors: Kunal Kandekar, Jersey City, NJ (US); Kenneth Jennings, Raleigh, NC (US); Christopher M. Amidon, Apex, NC (US); Juan A. Pons, Pittsboro, NC (US)

(73) Assignee: Waldeck Technology, LLC, Wilmington, DE (US)

( * ) Notice: Subject to any disclaimer, the term of this patent is extended or adjusted under 35 U.S.C. 154(b) by 216 days.

(21) Appl. No.: 12/969,675

(22) Filed: Dec. 16, 2010

(65) Prior Publication Data

US 2012/0063427 A1    Mar. 15, 2012

Related U.S. Application Data

(60) Provisional application No. 61/289,107, filed on Dec. 22, 2009.

(51) Int. Cl.
*H04L 12/16* (2006.01)

(52) U.S. Cl.
USPC .................. 370/270; 370/265; 455/456.1

(58) Field of Classification Search
USPC ......... 370/260, 259, 261, 262, 263, 265, 270, 370/338; 455/453, 456.1, 457; 709/204; 707/737, 780
See application file for complete search history.

(56) References Cited

U.S. PATENT DOCUMENTS

| | | | |
|---|---|---|---|
| 5,539,232 A | 7/1996 | Nakanishi et al. | |
| 6,204,844 B1 | 3/2001 | Fumarolo et al. | |
| 6,240,069 B1 | 5/2001 | Alperovich et al. | |
| 6,529,136 B2 | 3/2003 | Cao et al. | |
| 6,708,172 B1 | 3/2004 | Wong et al. | |
| 6,819,919 B1 | 11/2004 | Tanaka | |
| 6,968,179 B1 | 11/2005 | DeVries | |
| 6,987,885 B2 | 1/2006 | Gonzalez-Banos et al. | |
| 7,027,773 B1 * | 4/2006 | McMillin .................. | 455/41.2 |

(Continued)

FOREIGN PATENT DOCUMENTS

| | | |
|---|---|---|
| EP | 1463354 B1 | 12/2005 |
| WO | 2008/000046 A1 | 1/2008 |

(Continued)

OTHER PUBLICATIONS

Abstract, "Self-Organized Pedestrian Crowd Dynamics: Experiments, Simulations, and Design Solutions," by Helbing, D. et al., Transportation Science, vol. 39, Issue 1, Feb. 2005, obtained from ACM Digital Library at <http://portal.acm.org/citation.cfm?id=1247227>, printed Apr. 28, 2011, 2 pages.

(Continued)

*Primary Examiner* — Dady Chery

(57) ABSTRACT

Systems and methods are disclosed for forming crowds of users based on wireless contexts of corresponding mobile devices of the users. In general, wireless contexts of mobile devices of a number of users are obtained. For each mobile device, the wireless context of the mobile device includes a wireless Personal Area Network (PAN) context of the mobile device, a wireless Local Area Network (LAN) context of the mobile device, or both. The wireless contexts of the mobile devices of the users are then utilized to form crowds of users. More specifically, in one embodiment, users of mobile devices having sufficiently similar wireless contexts are determined to be in the same crowd of users.

34 Claims, 11 Drawing Sheets

(56) References Cited

U.S. PATENT DOCUMENTS

| | | | |
|---|---|---|---|
| 7,116,985 B2 | 10/2006 | Wilson et al. | |
| 7,123,918 B1 | 10/2006 | Goodman | |
| 7,236,739 B2 | 6/2007 | Chang | |
| 7,247,024 B2 | 7/2007 | Bright et al. | |
| 7,272,357 B2 | 9/2007 | Nishiga et al. | |
| 7,398,081 B2 | 7/2008 | Moran | |
| 7,423,580 B2 | 9/2008 | Markhovsky et al. | |
| 7,509,131 B2 | 3/2009 | Krumm et al. | |
| 7,558,404 B2 | 7/2009 | Ma et al. | |
| 7,620,404 B2 | 11/2009 | Chesnais et al. | |
| 7,680,959 B2 | 3/2010 | Svendsen | |
| 7,787,886 B2 | 8/2010 | Markhovsky et al. | |
| 8,010,601 B2 | 8/2011 | Jennings et al. | |
| 8,208,943 B2 | 6/2012 | Petersen et al. | |
| 2001/0013009 A1 | 8/2001 | Greening et al. | |
| 2002/0049690 A1 | 4/2002 | Takano | |
| 2002/0086676 A1 | 7/2002 | Hendrey et al. | |
| 2004/0009750 A1 | 1/2004 | Beros et al. | |
| 2004/0025185 A1 | 2/2004 | Goci et al. | |
| 2004/0192331 A1 | 9/2004 | Gorday et al. | |
| 2005/0038876 A1 | 2/2005 | Chaudhuri | |
| 2005/0070298 A1 | 3/2005 | Caspi et al. | |
| 2005/0174975 A1 | 8/2005 | Mgrdechian et al. | |
| 2005/0210387 A1 | 9/2005 | Alagappan et al. | |
| 2005/0231425 A1 | 10/2005 | Coleman et al. | |
| 2006/0046709 A1* | 3/2006 | Krumm et al. | 455/422.1 |
| 2006/0161599 A1 | 7/2006 | Rosen | |
| 2006/0166679 A1 | 7/2006 | Karaoguz et al. | |
| 2006/0256959 A1 | 11/2006 | Hymes | |
| 2006/0270419 A1 | 11/2006 | Crowley et al. | |
| 2007/0005419 A1 | 1/2007 | Horvitz et al. | |
| 2007/0015518 A1 | 1/2007 | Winter et al. | |
| 2007/0030824 A1 | 2/2007 | Ribaudo et al. | |
| 2007/0032242 A1 | 2/2007 | Goodman | |
| 2007/0075898 A1 | 4/2007 | Markhovsky et al. | |
| 2007/0080288 A1* | 4/2007 | Lim et al. | 250/227.21 |
| 2007/0135138 A1 | 6/2007 | Brown et al. | |
| 2007/0142065 A1 | 6/2007 | Richey et al. | |
| 2007/0167174 A1 | 7/2007 | Halcrow et al. | |
| 2007/0174243 A1 | 7/2007 | Fritz | |
| 2007/0174467 A1* | 7/2007 | Ballou et al. | 709/227 |
| 2007/0203644 A1 | 8/2007 | Thota et al. | |
| 2007/0218900 A1 | 9/2007 | Abhyanker | |
| 2007/0255785 A1 | 11/2007 | Hayashi et al. | |
| 2007/0282621 A1 | 12/2007 | Altman et al. | |
| 2008/0016018 A1 | 1/2008 | Malik | |
| 2008/0016205 A1 | 1/2008 | Svendsen | |
| 2008/0076418 A1 | 3/2008 | Beyer, Jr. | |
| 2008/0086741 A1 | 4/2008 | Feldman et al. | |
| 2008/0097999 A1 | 4/2008 | Horan | |
| 2008/0106599 A1 | 5/2008 | Liu et al. | |
| 2008/0118106 A1 | 5/2008 | Kilambi et al. | |
| 2008/0140650 A1 | 6/2008 | Stackpole | |
| 2008/0155080 A1 | 6/2008 | Marlow et al. | |
| 2008/0182563 A1 | 7/2008 | Wugofski et al. | |
| 2008/0182591 A1 | 7/2008 | Krikorian | |
| 2008/0188261 A1 | 8/2008 | Arnone | |
| 2008/0222295 A1 | 9/2008 | Robinson et al. | |
| 2008/0227473 A1 | 9/2008 | Haney | |
| 2008/0250312 A1 | 10/2008 | Curtis | |
| 2008/0306826 A1 | 12/2008 | Kramer et al. | |
| 2009/0003662 A1* | 1/2009 | Joseph et al. | 382/118 |
| 2009/0005052 A1* | 1/2009 | Abusch-Magder et al. | 455/446 |
| 2009/0023410 A1 | 1/2009 | Ghosh | |
| 2009/0024315 A1 | 1/2009 | Scheibe | |
| 2009/0030999 A1 | 1/2009 | Gatzke et al. | |
| 2009/0047972 A1 | 2/2009 | Neeraj | |
| 2009/0076894 A1 | 3/2009 | Bates et al. | |
| 2009/0082038 A1 | 3/2009 | McKiou et al. | |
| 2009/0112467 A1 | 4/2009 | Jiang et al. | |
| 2009/0115570 A1 | 5/2009 | Cusack, Jr. | |
| 2009/0115617 A1 | 5/2009 | Sano et al. | |
| 2009/0132652 A1 | 5/2009 | Athale et al. | |
| 2009/0144211 A1 | 6/2009 | O'Sullivan et al. | |
| 2009/0164431 A1 | 6/2009 | Zivkovic et al. | |
| 2009/0164459 A1 | 6/2009 | Jennings et al. | |
| 2009/0201896 A1 | 8/2009 | Davis et al. | |
| 2009/0287783 A1* | 11/2009 | Beare et al. | 709/206 |
| 2010/0130226 A1* | 5/2010 | Arrasvuori et al. | 455/456.1 |
| 2010/0197318 A1 | 8/2010 | Petersen et al. | |
| 2010/0197319 A1 | 8/2010 | Petersen et al. | |
| 2010/0198826 A1 | 8/2010 | Petersen et al. | |
| 2010/0198828 A1 | 8/2010 | Petersen et al. | |
| 2010/0198862 A1 | 8/2010 | Jennings et al. | |
| 2010/0198870 A1 | 8/2010 | Petersen et al. | |
| 2010/0198917 A1 | 8/2010 | Petersen et al. | |
| 2011/0136506 A1 | 6/2011 | Stewart | |
| 2012/0041983 A1 | 2/2012 | Jennings | |
| 2012/0066138 A1 | 3/2012 | Curtis et al. | |
| 2012/0066302 A1 | 3/2012 | Petersen et al. | |
| 2012/0072495 A1 | 3/2012 | Jennings et al. | |

FOREIGN PATENT DOCUMENTS

| | | |
|---|---|---|
| WO | 2009/039350 A1 | 3/2009 |
| WO | 2009/055501 A1 | 4/2009 |
| WO | 2009/077655 A1 | 6/2009 |

OTHER PUBLICATIONS

Anciaux, N. et al., "Data Degradation: Making Private Data Less Sensitive Over Time," CIKM 2008, Oct. 26-30, 2008, Napa Valley, California, 2 pages.

Arrington, M., "I Saw the Future of Social Networking the Other Day," TechCrunch, Apr. 9, 2008, at <http://www.techcrunch.com/2008/04/09/i-saw-the-future-of-social-networking-the-other-day/>, printed May 27, 2009, 28 pages.

Benford, S. et al., "Crowded Collaborative Virtual Environments," Proceedings of the SIGCHI Conference on Human Factors in Computing Systems, Atlanta, Georgia, Mar. 22-27, 1997, 7 pages.

"CitySense—Powered by Sense Networks," at <http://www.citysense.com/moreinfo.php>, copyright 2008, Sense Networks, printed Sep. 8, 2009, 2 pages.

"ConnectingCadence.com—Mapping the social world.," at <http://www.connectingcadence.com/>, found on the Internet Archive, copyright 2008, ConnectingCadence, printed Apr. 28, 2011, 1 page.

Cox et al., "SmokeScreen: Flexible Privacy Controls for Presence-Sharing," Proceedings of the 5th International Conference on Mobile Systems, Applications, and Services (2007) (MobiSys '07), Jun. 11-13, 2007, San Juan, Puerto Rico, 13 pages.

Cox, L.P. et al., "Presence-Exchanges: Toward Sustainable Presence-Sharing," In Proc. of 7th IEEE Workshop on Mobile Computing Systems and Applications, Apr. 6-7, 2006, Semiahmoo Resort, Washington, pp. 55-60, 6 pages.

Ertoz, L. et al., "Finding Clusters of Different Sizes, Shapes, and Densities in Noisy, High Dimensional Data," Proceedings of the 2003 SIAM International Conference on Data Mining (SDM 2003), Jan. 24, 2003, pp. 47-58, San Francisco, CA, 12 pages.

Estrin, M., "Is the MySpace crowd lying to marketers?", Oct. 16, 2007, posted at iMedia Connection, at <http://www.imediaconnection.com/content/16993.asp>, copyrighted by iMedia Communications, Inc., printed Apr. 28, 2011, 2 pages.

"Fire Eagle," at <http://fireeagle.yahoo.net>, copyright 2007-2011, Yahoo! Inc., printed Apr. 28, 2011, 2 pages.

"Flickr Shapefiles Public Dataset 1.0," posted by aaron on May 21, 2009, found at <http://code.flickr.com/blog/2009/05/21/flickr-shapefiles-public-dataset-10/>, Yahoo! Inc., printed Jul. 13, 2011, 5 pages.

Hardt, D. et al., "OpenID Attribute Exchange 1.0—Final," at <http://openid.net/specs/openid-attribute-exchange-1_0.html>, Dec. 5, 2007, 11 pages.

"MobiClique," copyright 2007-2009, Thomson, originally found at <http://www.thlab.net/~apietila/mobiclique/>, printed Oct. 23, 2009, 5 pages.

(56) References Cited

OTHER PUBLICATIONS

Ngai, Wang Kay et al., "Efficient Clustering of Uncertain Data," Proceedings of the Sixth International Conference on Data Mining (ICDM'06), Dec. 18-22, 2006, pp. 436-445, copyright 2006, IEEE, 10 pages.

Oh, Sejin et al., "CAMAR: Context-aware Mobile Augmented Reality in Smart Space," In Proceedings of International Workshop on Ubiquitous Virtual Reality 2009, Bruce Thomas et al. (Eds.), Jan. 15-18, 2009, University of South Australia, Adelaide, Australia, pp. 48-51, 4 pages.

"OpenID Foundation website," at <http://openid.net>, copyright 2006-2011, OpenID Foundation, printed Apr. 28, 2011, 2 pages.

Quinn, M. et al., "Parallel Implementation of the Social Forces Model," Proceedings of the Second International Conference in Pedestrian and Evacuation Dynamics, Greenwich, England, 2003, pp. 63-74, found at <http://web.engr.oregonstate.edu/~metoyer/docs/parallelPeds.pdf>, 12 pages.

"Sense Networks," at <http://www.sensenetworks.com/about_us.php>, copyright 2008-2010, Sense Networks, printed Apr. 28, 2011, 1 page.

"Six degrees of separation," at <http://en.wikipedia.org/wiki/Six_degrees_of_separation>, last modified on Apr. 19, 2011, printed Apr. 28, 2011, 11 pages.

Vigueras, G. et al., "A comparative study of partitioning methods for crowd simulations," Applied Soft Computing, vol. 10, Issue 1, Jan. 2010, received Dec. 20, 2008, received in revised form Jul. 1, 2009, available online Jul. 22, 2009, pp. 225-235, 12 pages.

"What is LinkedIn?," at <http://www.linkedin.com/static?key=what_is_linkedin&trk=hb_what>, copyright 2011, LinkedIn Corporation, printed Apr. 28, 2011, 1 page.

Wu et al., "Crowd Flow Segmentation Using a Novel Region Growing Scheme," In Proceedings PCM 2009, 10th Pacific Rim Conference on Multimedia, Bangkok, Thailand, Dec. 15-18, 2009, pp. 898-907, 10 pages.

\* cited by examiner

CROWD FORMATION BASED ON WIRELESS CONTEXT INFORMATION

RELATED APPLICATIONS

This application claims the benefit of provisional patent application Ser. No. 61/289,107, filed Dec. 22, 2009, the disclosure of which is hereby incorporated herein by reference in its entirety.

FIELD OF THE DISCLOSURE

The present disclosure relates to forming crowds of users and more specifically relates to forming crowds of users based on wireless contexts of corresponding mobile devices.

BACKGROUND

With the proliferation of location-aware mobile devices in today's society, numerous location-based services have emerged. One such service is described in U.S. patent application Ser. No. 12/645,532, entitled FORMING CROWDS AND PROVIDING ACCESS TO CROWD DATA IN A MOBILE ENVIRONMENT, which was filed Dec. 23, 2009; U.S. patent application Ser. No. 12/645,539, entitled ANONYMOUS CROWD TRACKING, which was filed Dec. 23, 2009; U.S. patent application Ser. No. 12/645,535, entitled MAINTAINING A HISTORICAL RECORD OF ANONYMIZED USER PROFILE DATA BY LOCATION FOR USERS IN A MOBILE ENVIRONMENT, which was filed Dec. 23, 2009; U.S. patent application Ser. No. 12/645,546, entitled CROWD FORMATION FOR MOBILE DEVICE USERS, which was filed Dec. 23, 2009; U.S. patent application Ser. No. 12/645,556, entitled SERVING A REQUEST FOR DATA FROM A HISTORICAL RECORD OF ANONYMIZED USER PROFILE DATA IN A MOBILE ENVIRONMENT, which was filed Dec. 23, 2009; U.S. patent application Ser. No. 12/645,560, entitled HANDLING CROWD REQUESTS FOR LARGE GEOGRAPHIC AREAS, which was filed Dec. 23, 2009; and U.S. patent application Ser. No. 12/645,544, entitled MODIFYING A USER'S CONTRIBUTION TO AN AGGREGATE PROFILE BASED ON TIME BETWEEN LOCATION UPDATES AND EXTERNAL EVENTS, which was filed Dec. 23, 2009; all of which are hereby incorporated herein by reference in their entireties. Particularly, the aforementioned patent applications describe, among other things, a system and method for forming crowds of users. Specifically, the disclosed system and method utilize a spatial crowd formation process to form crowds of users based on the current locations of the users.

One issue with a purely spatial crowd formation process is that, depending on the particular technology utilized to obtain the current locations of the users, there may be a significant amount of error. For example, the error of a Global Positioning System (GPS) receiver may be up to 30 meters (m). This issue is further compounded when the users are indoors. Due to such errors, when venues or Points of Interest (POIs) are located relatively close to one another (e.g., stores in a shopping mall), it is often difficult to discern persons gathered in one POI from persons gathered in an adjacent or nearby POI. For example, if two POIs are separated only by a wall, then it is difficult to discern persons on one side of the wall from users on the other side of the wall. As a result, a purely spatial crowd formation process may fail to provide the desired accuracy. As such, there is a need for a system and method for forming crowds of users that provides delineation between users located at POIs that are relatively close to one another.

SUMMARY

Systems and methods are disclosed for forming crowds of users based on wireless contexts of corresponding mobile devices of the users. In general, wireless contexts of mobile devices of a number of users are obtained. For each mobile device, the wireless context of the mobile device includes a wireless Personal Area Network (PAN) context of the mobile device, a wireless Local Area Network (LAN) context of the mobile device, or both. In one embodiment, the wireless PAN context of the mobile device includes a list of PAN-enabled devices detected within proximity to the mobile device. In addition, the wireless PAN context may include, for each detected PAN-enabled device, a quality metric indicative of a quality of signals received by the mobile device from the PAN-enabled device and/or a connection between the mobile device and the PAN-enabled device. In one embodiment, the wireless LAN context of a mobile device includes a wireless LAN identifier for each of one or more wireless LANs detected by the mobile device. In addition, the wireless LAN context may include, for each detected wireless LAN, a quality metric indicative of a quality of signals received by the mobile device from an access point of the wireless LAN and/or a connection between the mobile device and the access point of the wireless LAN. The wireless contexts of the mobile devices of the users are then utilized to form crowds of users. More specifically, in one embodiment, users of mobile devices having sufficiently similar wireless contexts are determined to be in the same crowd of users.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1:
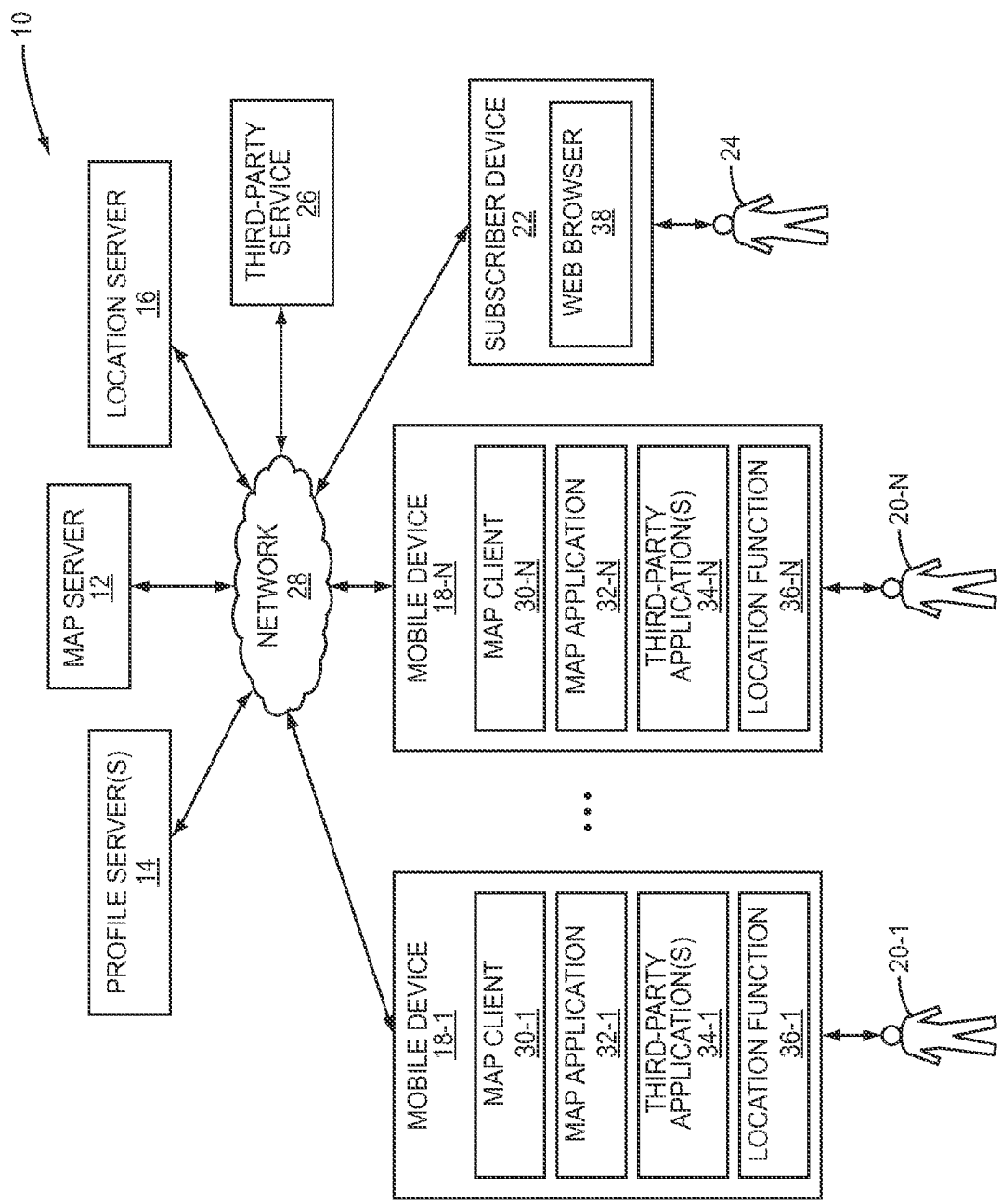
FIG. 1 illustrates a system for forming crowds of users based on wireless contexts of corresponding mobile devices according to one embodiment of the present disclosure.

FIG. 1 illustrates a Mobile Aggregate Profile (MAP) system 10 (hereinafter "system 10") that forms crowds of users based on wireless context data according to one embodiment of the present disclosure. Note that the system 10 is exemplary and is not intended to limit the scope of the present disclosure. In this embodiment, the system 10 includes a MAP server 12, one or more profile servers 14, a location server 16, a number of mobile devices 18-1 through 18-N (generally referred to herein collectively as mobile devices 18 and individually as mobile device 18) having associated users 20-1 through 20-N (generally referred to herein collectively as users 20 and individually as user 20), a subscriber device 22 having an associated subscriber 24, and a third-party service 26 communicatively coupled via a network 28. The network 28 may be any type of network or any combination of networks. Specifically, the network 28 may include wired components, wireless components, or both wired and wireless components. In one exemplary embodiment, the network 28 is a distributed public network such as the Internet, where the mobile devices 18 are enabled to connect to the network 28 via local wireless connections (e.g., Wi-Fi® or IEEE 802.11 connections) or wireless telecommunications connections (e.g., 3G or 4G telecommunications connections such as GSM, LTE, W-CDMA, or WiMAX® connections).

As discussed below in detail, the MAP server 12 operates to obtain current locations including location updates for the users 20 of the mobile devices 18, user profiles of the users 20 of the mobile devices 18, and wireless contexts of the mobile devices 18 of the users 20. The current locations of the users 20 can be expressed as positional geographic coordinates such as latitude-longitude pairs, and a height vector (if applicable), or any other similar information capable of identifying a given physical point in space in a two-dimensional or three-dimensional coordinate system. The user profiles of the users 20 generally include interests of the users 20, which are preferably expressed as keywords. As described below in detail, the wireless contexts of the mobile devices 18 of the users 20 include wireless Personal Area Network (PAN) contexts and/or wireless Local Area Network (LAN) contexts of the mobile devices 18 of the users 20. Using the current locations of the users 20, the wireless contexts of the mobile devices 18 of the users 20, and the user profiles of the users 20, the MAP server 12 is enabled to provide a number of features such as, but not limited to, forming crowds of users and generating aggregate profiles for crowds of users. Note that while the MAP server 12 is illustrated as a single server for simplicity and ease of discussion, it should be appreciated that the MAP server 12 may be implemented as a single physical server or multiple physical servers operating in a collaborative manner for purposes of redundancy and/or load sharing.

In general, the one or more profile servers 14 operate to store user profiles for a number of persons including the users 20 of the mobile devices 18. For example, the one or more profile servers 14 may be servers providing social network services such as the Facebook® social networking service, the MySpace® social networking service, the LinkedIN® social networking service, or the like. As discussed below, using the one or more profile servers 14, the MAP server 12 is enabled to directly or indirectly obtain the user profiles of the users 20 of the mobile devices 18. The location server 16 generally operates to receive location updates from the mobile devices 18 and make the location updates available to entities such as, for instance, the MAP server 12. In one exemplary embodiment, the location server 16 is a server operating to provide Yahoo!'s Fire Eagle® service.

The mobile devices 18 may be mobile smart phones, portable media player devices, mobile gaming devices, or the like. Some exemplary mobile devices that may be programmed or otherwise configured to operate as the mobile devices 18 are the Apple® iPhone®, the Palm Pre®, the Samsung Rogue™, the Blackberry Storm™, the Motorola Droid or similar phone running Google's Android™ Operating System, an Apple® iPad™, and the Apple® iPod Touch® device. However, this list of exemplary mobile devices is not exhaustive and is not intended to limit the scope of the present disclosure.

The mobile devices 18-1 through 18-N include MAP clients 30-1 through 30-N (generally referred to herein collectively as MAP clients 30 or individually as MAP client 30), MAP applications 32-1 through 32-N (generally referred to herein collectively as MAP applications 32 or individually as MAP application 32), third-party applications 34-1 through 34-N (generally referred to herein collectively as third-party applications 34 or individually as third-party application 34), and location functions 36-1 through 36-N (generally referred to herein collectively as location functions 36 or individually as location function 36), respectively. The MAP client 30 is preferably implemented in software. In general, in the preferred embodiment, the MAP client 30 is a middleware layer operating to interface an application layer (i.e., the MAP application 32 and the third-party applications 34) to the MAP server 12. More specifically, the MAP client 30 enables the MAP application 32 and the third-party applications 34 to request and receive data from the MAP server 12. In addition, the MAP client 30 enables applications, such as the MAP application 32 and the third-party applications 34, to access data from the MAP server 12.

The MAP application 32 is also preferably implemented in software. The MAP application 32 generally provides a user interface component between the user 20 and the MAP server 12. More specifically, among other things, the MAP application 32 enables the user 20 to initiate crowd requests sent to the MAP server 12 and presents corresponding data returned by the MAP server 12 to the user 20. The MAP application 32 also enables the user 20 to configure various settings. For example, the MAP application 32 may enable the user 20 to select a desired social networking service (e.g., Facebook®, MySpace®, LinkedIN®, etc.) from which to obtain the user profile of the user 20 and provide any necessary credentials (e.g., username and password) needed to access the user profile from the social networking service.

The third-party applications 34 are preferably implemented in software. The third-party applications 34 operate to access the MAP server 12 via the MAP client 30. The third-party applications 34 may utilize data obtained from the MAP server 12 in any desired manner. As an example, one of the third-party applications 34 may be a gaming application that utilizes crowd data to notify the user 20 of Points of Interest (POIs) or Areas of Interest (AOIs) where crowds of interest are currently located. It should be noted that while the MAP client 30 is illustrated as being separate from the MAP application 32 and the third-party applications 34, the present disclosure is not limited thereto. The functionality of the MAP client 30 may alternatively be incorporated into the MAP application 32 and the third-party applications 34.

The location function 36 may be implemented in hardware, software, or a combination thereof. In general, the location function 36 operates to determine or otherwise obtain the location of the mobile device 18. For example, the location function 36 may be or include a Global Positioning System (GPS) receiver. In addition or alternatively, the location function 36 may include hardware and/or software that enables improved location tracking in indoor environments such as, for example, shopping malls. For example, the location function 36 may be part of or compatible with the InvisiTrack Location System provided by InvisiTrack and described in U.S. Pat. No. 7,423,580 entitled "Method and System of Three-Dimensional Positional Finding" which issued on Sep. 9, 2008, U.S. Pat. No. 7,787,886 entitled "System and Method for Locating a Target using RFID" which issued on Aug. 31, 2010, and U.S. Patent Application Publication No. 2007/0075898 entitled "Method and System for Positional Finding Using RF, Continuous and/or Combined Movement" which published on Apr. 5, 2007, all of which are hereby incorporated herein by reference for their teachings regarding location tracking. The location function 36 may also include manual location reporting methods, such as check-ins, as popularized by location-based services such as Four-Square™, Gowalla®, and Facebook® Places, whereby users can manually report their current location or venue to a server via a mobile device.

The subscriber device 22 is a physical device such as a personal computer, a mobile computer (e.g., a notebook computer, a netbook computer, a tablet computer, etc.), a mobile smart phone, or the like. The subscriber 24 associated with the subscriber device 22 is a person or entity. In general, the subscriber device 22 enables the subscriber 24 to access the MAP server 12 via a web browser 38 to obtain various types of data, preferably for a fee. For example, the subscriber 24 may pay a fee to have access to crowd data such as aggregate profiles for crowds located at one or more POIs and/or located in one or more AOIs, pay a fee to track crowds, or the like. Note that the web browser 38 is exemplary. In another embodiment, the subscriber device 22 is enabled to access the MAP server 12 via a custom application.

Lastly, the third-party service 26 is a service that has access to data from the MAP server 12 such as aggregate profiles for one or more crowds at one or more POIs or within one or more AOIs. Based on the data from the MAP server 12, the third-party service 26 operates to provide a service such as, for example, targeted advertising. For example, the third-party service 26 may obtain anonymous aggregate profile data for one or more crowds located at a POI and then provide targeted advertising to known users located at the POI based on the anonymous aggregate profile data. Note that while targeted advertising is mentioned as an exemplary third-party service 26, other types of third-party services 26 may additionally or alternatively be provided. Other types of third-party services 26 that may be provided will be apparent to one of ordinary skill in the art upon reading this disclosure.

Before proceeding, it should be noted that while the system 10 of FIG. 1 illustrates an embodiment where the one or more profile servers 14 and the location server 16 are separate from the MAP server 12, the present disclosure is not limited thereto. In an alternative embodiment, the functionality of the one or more profile servers 14 and/or the location server 16 may be implemented within the MAP server 12.

Figure 2:
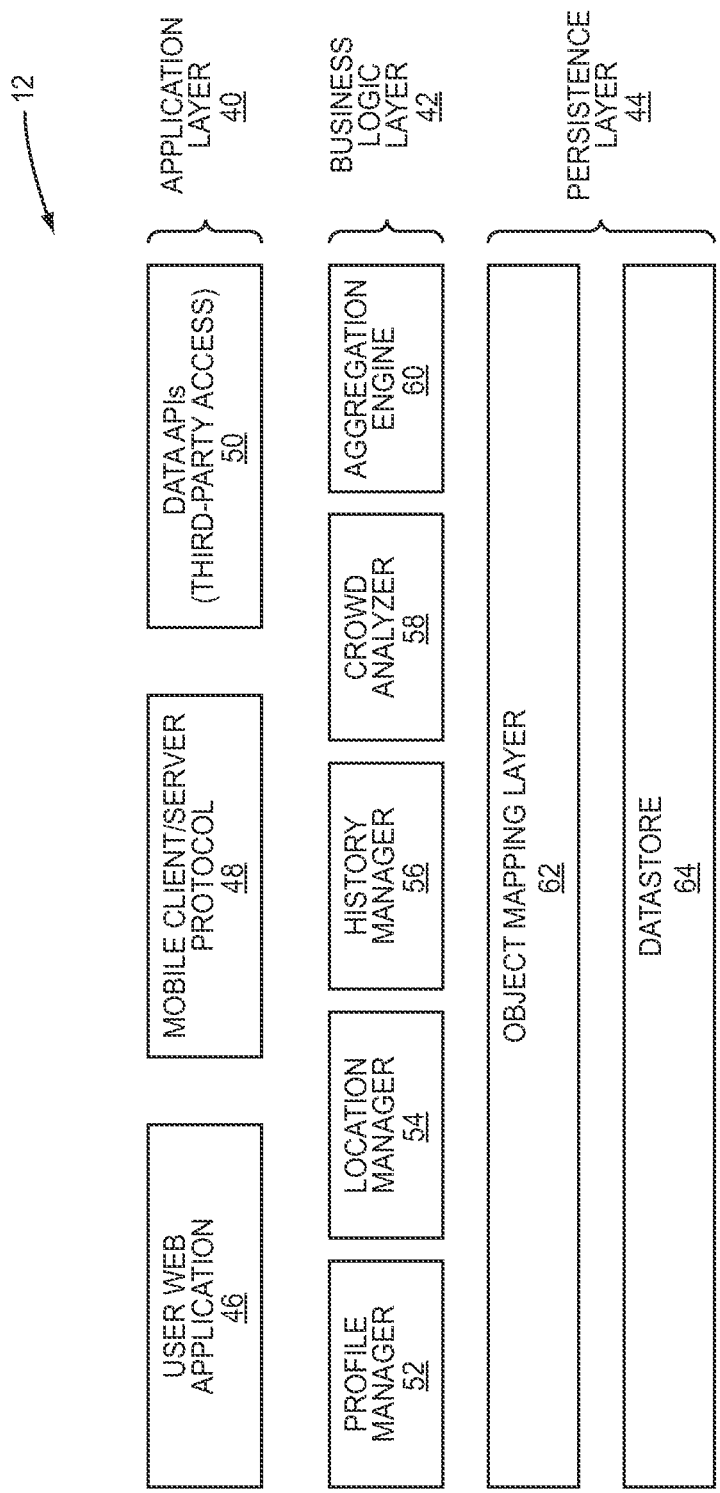
FIG. 2 is a more detailed illustration of the Mobile Aggregate Profile (MAP) server of FIG. 1 according to one embodiment of the present disclosure.

FIG. 2 is a block diagram of the MAP server 12 of FIG. 1 according to one embodiment of the present disclosure. As illustrated, the MAP server 12 includes an application layer 40, a business logic layer 42, and a persistence layer 44. The application layer 40 includes a user web application 46, a mobile client/server protocol component 48, and one or more data Application Programming Interfaces (APIs) 50. The user web application 46 is preferably implemented in software and operates to provide a web interface for users, such as the subscriber 24, to access the MAP server 12 via a web browser. The mobile client/server protocol component 48 is preferably implemented in software and operates to provide an interface between the MAP server 12 and the MAP clients 30 hosted by the mobile devices 18. The data APIs 50 enable third-party services, such as the third-party service 26, to access the MAP server 12.

The business logic layer 42 includes a profile manager 52, a location manager 54, a history manager 56, a crowd analyzer 58, and an aggregation engine 60, each of which is preferably implemented in software. The profile manager 52 generally operates to obtain the user profiles of the users 20 directly or indirectly from the one or more profile servers 14 and store the user profiles in the persistence layer 44. The location manager 54 operates to obtain the current locations of the users 20 including location updates. As discussed below, the current locations of the users 20 may be obtained directly from the mobile devices 18 and/or obtained from the location server 16.

The history manager 56 generally operates to maintain a historical record of anonymized user profile data by location. Note that while the user profile data stored in the historical record is preferably anonymized, it is not limited thereto. The crowd analyzer 58 operates to form crowds of users based on the locations of the users 20 and the wireless contexts of the mobile devices 18 of the users 20, as described below in detail. The aggregation engine 60 generally operates to provide aggregate profile data in response to requests from the mobile devices 18, the subscriber device 22, and the third-party service 26. The aggregate profile data may be historical aggregate profile data for one or more POIs or one or more AOIs or aggregate profile data for crowd(s) currently at one or more POIs or within one or more AOIs. The discussion herein focuses on one embodiment of a crowd formation process performed by the crowd analyzer 58. For a spatial crowd formation process that may be used to supplement the crowd formation process described herein as well as for additional information regarding the operation of the profile manager 52, the location manager 54, the history manager 56, and the aggregation engine 60, the interested reader is directed to U.S. patent application Ser. No. 12/645,532, entitled FORMING CROWDS AND PROVIDING ACCESS TO CROWD DATA IN A MOBILE ENVIRONMENT, which was filed Dec. 23, 2009; U.S. patent application Ser. No. 12/645,539, entitled ANONYMOUS CROWD TRACKING, which was filed Dec. 23, 2009; U.S. patent application Ser. No. 12/645,535, entitled MAINTAINING A HISTORICAL RECORD OF ANONYMIZED USER PROFILE DATA BY LOCATION FOR USERS IN A MOBILE ENVIRONMENT, which was filed Dec. 23, 2009; U.S. patent application Ser. No. 12/645,546, entitled CROWD FORMATION FOR MOBILE DEVICE USERS, which was filed Dec. 23, 2009; U.S. patent application Ser. No. 12/645,556, entitled SERVING A REQUEST FOR DATA FROM A HISTORICAL RECORD OF ANONYMIZED USER PROFILE DATA IN A MOBILE ENVIRONMENT, which was filed Dec. 23, 2009; U.S. patent application Ser. No. 12/645,560, entitled HANDLING CROWD REQUESTS FOR LARGE GEOGRAPHIC AREAS, which was filed Dec. 23, 2009; and U.S. patent application Ser. No. 12/645,544, entitled MODIFYING A USER'S CONTRIBUTION TO AN AGGREGATE PROFILE BASED ON TIME BETWEEN LOCATION UPDATES AND EXTERNAL EVENTS, which was filed Dec. 23, 2009; all of which have been incorporated herein by reference in their entireties.

The persistence layer 44 includes an object mapping layer 62 and a datastore 64. The object mapping layer 62 is preferably implemented in software. The datastore 64 is preferably a relational database, which is implemented in a combination of hardware (i.e., physical data storage hardware) and software (i.e., relational database software). In this embodiment, the business logic layer 42 is implemented in an object-oriented programming language such as, for example, Java. As such, the object mapping layer 62 operates to map objects used in the business logic layer 42 to relational database entities stored in the datastore 64. Note that, in one embodiment, data is stored in the datastore 64 in a Resource Description Framework (RDF) compatible format.

In an alternative embodiment, rather than being a relational database, the datastore 64 may be implemented as an RDF datastore. More specifically, the RDF datastore may be compatible with RDF technology adopted by Semantic Web activities. Namely, the RDF datastore may use the Friend-Of-A-Friend (FOAF) vocabulary for describing people, their social networks, and their interests. In this embodiment, the MAP server 12 may be designed to accept raw FOAF files describing persons, their friends, and their interests. These FOAF files are currently output by some social networking services such as LiveJournal® and Facebook®. The MAP server 12 may then persist RDF descriptions of the users 20 as a proprietary extension of the FOAF vocabulary that includes additional properties desired for the system 10.

Figure 3:
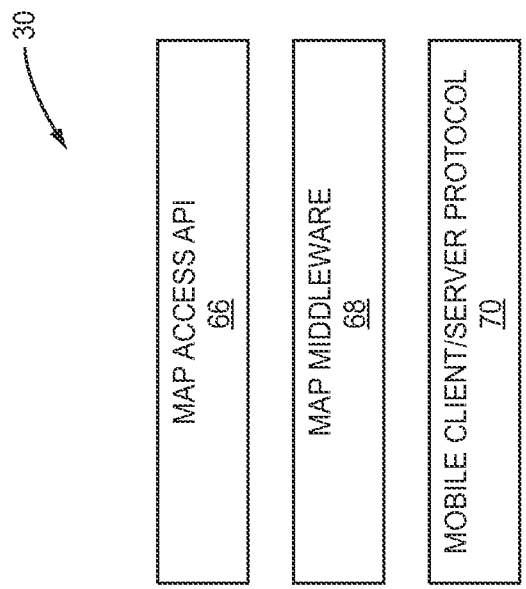
FIG. 3 is a more detailed illustration of the MAP client of one of the mobile devices of FIG. 1 according to one embodiment of the present disclosure.

FIG. 3 illustrates the MAP client 30 of FIG. 1 in more detail according to one embodiment of the present disclosure. As illustrated, in this embodiment, the MAP client 30 includes a MAP access API 66, a MAP middleware component 68, and a mobile client/server protocol component 70. The MAP access API 66 is implemented in software and provides an interface by which the MAP client 30 and the third-party applications 34 are enabled to access the MAP client 30. The MAP middleware component 68 is implemented in software and performs the operations needed for the MAP client 30 to operate as an interface between the MAP application 32 and the third-party applications 34 at the mobile device 18 and the MAP server 12. The mobile client/server protocol component 70 enables communication between the MAP client 30 and the MAP server 12 via a defined protocol.

Figure 4:
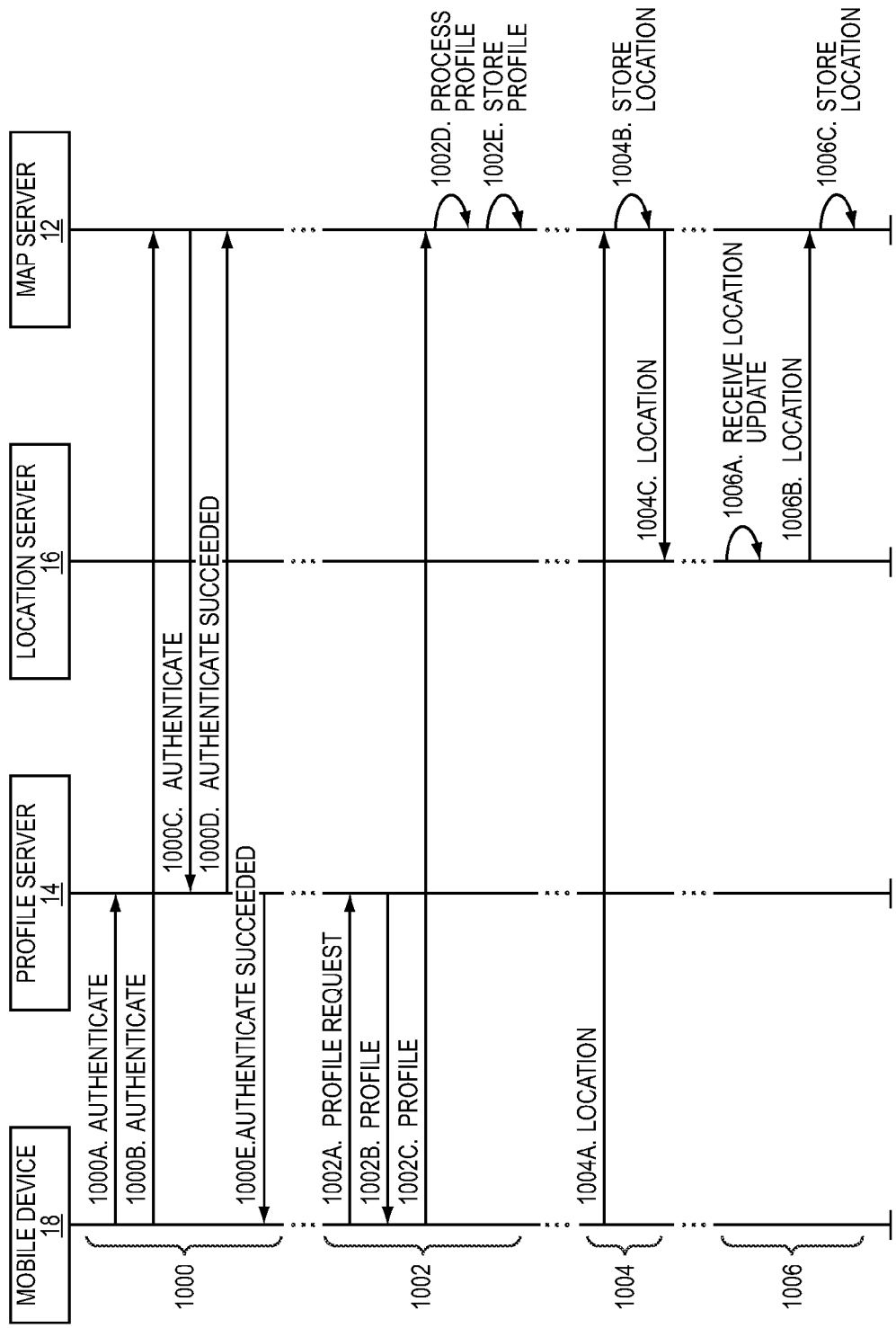
FIG. 4 illustrates the operation of the system of FIG. 1 to obtain the user profiles and location updates for the users of the mobile devices according to one embodiment of the present disclosure.

FIG. 4 illustrates the operation of the system 10 of FIG. 1 to provide the user profile of one of the users 20 of one of the mobile devices 18 to the MAP server 12 according to one embodiment of the present disclosure. This discussion is equally applicable to the other users 20 of the other mobile devices 18. First, an authentication process is performed (step 1000). For authentication, in this embodiment, the mobile device 18 authenticates with the profile server 14 (step 1000A) and the MAP server 12 (step 1000B). In addition, the MAP server 12 authenticates with the profile server 14 (step 1000C). Preferably, authentication is performed using OpenID or similar technology. However, authentication may alternatively be performed using separate credentials (e.g., username and password) of the user 20 for access to the MAP server 12 and the profile server 14. Assuming that authentication is successful, the profile server 14 returns an authentication succeeded message to the MAP server 12 (step 1000D), and the profile server 14 returns an authentication succeeded message to the MAP client 30 of the mobile device 18 (step 1000E).

At some point after authentication is complete, a user profile process is performed such that a user profile of the user 20 is obtained from the profile server 14 and delivered to the MAP server 12 (step 1002). In this embodiment, the MAP client 30 of the mobile device 18 sends a profile request to the profile server 14 (step 1002A). In response, the profile server 14 returns the user profile of the user 20 to the mobile device 18 (step 1002B). The MAP client 30 of the mobile device 18 then sends the user profile of the user 20 to the MAP server 12 (step 1002C). Note that while in this embodiment the MAP client 30 sends the complete user profile of the user 20 to the MAP server 12, in an alternative embodiment, the MAP client 30 may filter the user profile of the user 20 according to criteria specified by the user 20. For example, the user profile of the user 20 may include demographic information, general interests, music interests, and movie interests, and the user 20 may specify that the demographic information or some subset thereof is to be filtered, or removed, before sending the user profile to the MAP server 12.

Upon receiving the user profile of the user 20 from the MAP client 30 of the mobile device 18, the profile manager 52 of the MAP server 12 processes the user profile (step 1002D). More specifically, in the preferred embodiment, the profile manager 52 includes social network handlers for the social network services supported by the MAP server 12 that operate to map the user profiles of the users 20 obtained from the social network services to a common format utilized by the MAP server 12. This common format includes a number of user profile categories, or user profile slices, such as, for example, a demographic profile category, a social interaction profile category, a general interests category, a music interests profile category, and a movie interests profile category. In addition, as discussed below, the user profiles of the users 20 maintained by the MAP server 12 include a dynamic profile slice that is automatically updated by the MAP server 12 based on real-time user-generated contexts of the users 20 (e.g., search terms entered by the users 20).

For example, if the MAP server 12 supports user profiles from Facebook®, MySpace®, and LinkedIN®, the profile manager 52 may include a Facebook handler, a MySpace handler, and a LinkedIN handler. The social network handlers process user profiles from the corresponding social network services to generate user profiles for the users 20 in the common format used by the MAP server 12. For this example assume that the user profile of the user 20 is from Facebook®. The profile manager 52 uses a Facebook handler to process the user profile of the user 20 to map the user profile of the user 20 from Facebook® to a user profile for the user 20 for the MAP server 12 that includes lists of keywords for a number of predefined profile categories, or profile slices, such as, for example, a demographic profile category, a social interaction profile category, a general interests profile category, a music interests profile category, and a movie interests profile category. As such, the user profile of the user 20 from Facebook® may be processed by the Facebook handler of the profile manager 52 to create a list of keywords such as, for example, liberal, High School Graduate, 35-44, College Graduate, etc. for the demographic profile category; a list of keywords such as Seeking Friendship for the social interaction profile category; a list of keywords such as politics, technology, photography, books, etc. for the general interests profile category; a list of keywords including music genres, artist names, album names, or the like for the music interests profile category; and a list of keywords including movie titles, actor or actress names, director names, movie genres, or the like for the movie interests profile category. In one embodiment, the profile manager 52 may use natural language processing or semantic analysis. For example, if the Facebook® user profile of the user 20 states that the user 20 is 20 years old, semantic analysis may result in the keyword of 18-24 years old being stored in the user profile of the user 20 for the MAP server 12.

After processing the user profile of the user 20, the profile manager 52 of the MAP server 12 stores the resulting user profile for the user 20 (step 1002E). More specifically, in one embodiment, the MAP server 12 stores user records for the users 20 in the datastore 64 (FIG. 2). The user profile of the user 20 is stored in the user record of the user 20. The user record of the user 20 includes a unique identifier of the user 20, the user profile of the user 20, and, as discussed below, a current location of the user 20. Note that the user profile of the user 20 may be updated as desired. For example, in one embodiment, the user profile of the user 20 is updated by repeating step 1002 each time the user 20 activates the MAP application 32.

Note that while the discussion herein focuses on an embodiment where the user profiles of the users 20 are obtained from the one or more profile servers 14, the user profiles of the users 20 may be obtained in any desired manner. For example, in one alternative embodiment, the user 20 may identify one or more favorite websites. The profile manager 52 of the MAP server 12 may then crawl the one or more favorite websites of the user 20 to obtain keywords appearing in the one or more favorite websites of the user 20. These keywords may then be stored as the user profile of the user 20.

At some point, a process is performed such that a current location of the mobile device 18 and thus a current location of the user 20 is obtained by the MAP server 12 (step 1004). In this embodiment, the MAP application 32 of the mobile device 18 obtains the current location of the mobile device 18 from the location function 36 of the mobile device 18. The MAP application 32 then provides the current location of the mobile device 18 to the MAP client 30, and the MAP client 30 then provides the current location of the mobile device 18 to the MAP server 12 (step 1004A). Note that step 1004A may be repeated periodically or in response to a change in the current location of the mobile device 18 in order for the MAP application 32 to provide location updates for the user 20 to the MAP server 12.

In response to receiving the current location of the mobile device 18, the location manager 54 of the MAP server 12 stores the current location of the mobile device 18 as the current location of the user 20 (step 1004B). More specifically, in one embodiment, the current location of the user 20 is stored in the user record of the user 20 maintained in the datastore 64 of the MAP server 12. Note that, in the preferred embodiment, only the current location of the user 20 is stored in the user record of the user 20. In this manner, the MAP server 12 maintains privacy for the user 20 since the MAP server 12 does not maintain a historical record of the location of the user 20. Any historical data maintained by the MAP server 12 is preferably anonymized by the history manager 56 in order to maintain the privacy of the users 20.

In addition to storing the current location of the user 20, the location manager 54 sends the current location of the user 20 to the location server 16 (step 1004C). In this embodiment, by providing location updates to the location server 16, the MAP server 12 in return receives location updates for the user 20 from the location server 16. This is particularly beneficial when the mobile device 18 does not permit background processes. If the mobile device 18 does not permit background processes, the MAP application 32 will not be able to provide location updates for the user 20 to the MAP server 12 unless the MAP application 32 is active. Therefore, when the MAP application 32 is not active, other applications running on the mobile device 18 (or some other device of the user 20) may directly or indirectly provide location updates to the location server 16 for the user 20. This is illustrated in step 1006 where the location server 16 receives a location update for the user 20 directly or indirectly from another application running on the mobile device 18 or an application running on another device of the user 20 (step 1006A). The location server 16 then provides the location update for the user 20 to the MAP server 12 (step 1006B). In response, the location manager 54 updates and stores the current location of the user 20 in the user record of the user 20 (step 1006C). In this manner, the MAP server 12 is enabled to obtain location updates for the user 20 even when the MAP application 32 is not active at the mobile device 18.

Figure 5:
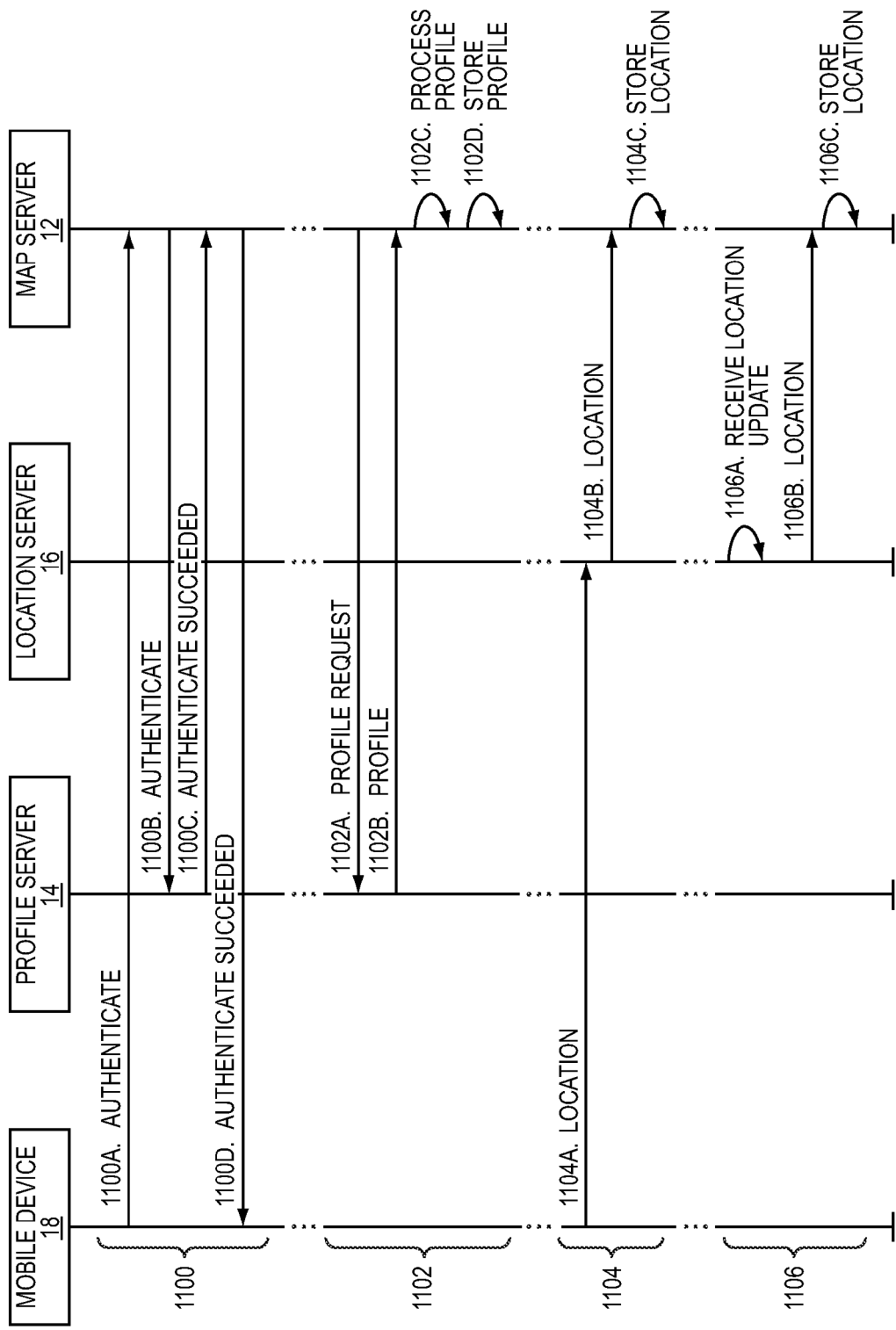
FIG. 5 illustrates the operation of the system of FIG. 1 to obtain the user profiles and location updates for the users of the mobile devices according to another embodiment of the present disclosure.

FIG. 5 illustrates the operation of the system 10 of FIG. 1 to provide the user profile of the user 20 of one of the mobile devices 18 to the MAP server 12 according to another embodiment of the present disclosure. This discussion is equally applicable to user profiles of the users 20 of the other mobile devices 18. First, an authentication process is performed (step 1100). For authentication, in this embodiment, the mobile device 18 authenticates with the MAP server 12 (step 1100A), and the MAP server 12 authenticates with the profile server 14 (step 1100B). Preferably, authentication is performed using OpenID or similar technology. However, authentication may alternatively be performed using separate credentials (e.g., username and password) of the user 20 for access to the MAP server 12 and the profile server 14. Assuming that authentication is successful, the profile server 14 returns an authentication succeeded message to the MAP server 12 (step 1100C), and the MAP server 12 returns an authentication succeeded message to the MAP client 30 of the mobile device 18 (step 1100D).

At some point after authentication is complete, a user profile process is performed such that a user profile of the user 20 is obtained from the profile server 14 and delivered to the MAP server 12 (step 1102). In this embodiment, the profile manager 52 of the MAP server 12 sends a profile request to the profile server 14 (step 1102A). In response, the profile server 14 returns the user profile of the user 20 to the profile manager 52 of the MAP server 12 (step 1102B). Note that while in this embodiment the profile server 14 returns the complete user profile of the user 20 to the MAP server 12, in an alternative embodiment, the profile server 14 may return a filtered version of the user profile of the user 20 to the MAP server 12. The profile server 14 may filter the user profile of the user 20 according to criteria specified by the user 20. For example, the user profile of the user 20 may include demographic information, general interests, music interests, and movie interests, and the user 20 may specify that the demographic information or some subset thereof is to be filtered, or removed, before sending the user profile to the MAP server 12.

Upon receiving the user profile of the user 20, the profile manager 52 of the MAP server 12 processes the user profile (step 1102C). More specifically, as discussed above, in the preferred embodiment, the profile manager 52 includes social network handlers for the social network services supported by the MAP server 12. The social network handlers process user profiles to generate user profiles for the MAP server 12 that include lists of keywords for each of a number of profile categories, or profile slices.

After processing the user profile of the user 20, the profile manager 52 of the MAP server 12 stores the resulting user profile for the user 20 (step 1102D). More specifically, in one embodiment, the MAP server 12 stores user records for the users 20 in the datastore 64 (FIG. 2). The user profile of the user 20 is stored in the user record of the user 20. The user record of the user 20 includes a unique identifier of the user 20, the user profile of the user 20, and, as discussed below, a current location of the user 20. Note that the user profile of the user 20 may be updated as desired. For example, in one embodiment, the user profile of the user 20 is updated by repeating step 1102 each time the user 20 activates the MAP application 32.

Note that while the discussion herein focuses on an embodiment where the user profiles of the users 20 are obtained from the one or more profile servers 14, the user profiles of the users 20 may be obtained in any desired manner. For example, in one alternative embodiment, the user 20 may identify one or more favorite websites. The profile manager 52 of the MAP server 12 may then crawl the one or more favorite websites of the user 20 to obtain keywords appearing in the one or more favorite websites of the user 20. These keywords may then be stored as the user profile of the user 20.

At some point, a process is performed such that a current location of the mobile device 18 and thus a current location of the user 20 is obtained by the MAP server 12 (step 1104). In this embodiment, the MAP application 32 of the mobile device 18 obtains the current location of the mobile device 18 from the location function 36 of the mobile device 18. The MAP application 32 then provides the current location of the user 20 of the mobile device 18 to the location server 16 (step 1104A). Note that step 1104A may be repeated periodically or in response to changes in the location of the mobile device 18 in order to provide location updates for the user 20 to the MAP server 12. The location server 16 then provides the current location of the user 20 to the MAP server 12 (step 1104B). The location server 16 may provide the current location of the user 20 to the MAP server 12 automatically in response to receiving the current location of the user 20 from the mobile device 18 or in response to a request from the MAP server 12.

In response to receiving the current location of the mobile device 18, the location manager 54 of the MAP server 12 stores the current location of the mobile device 18 as the current location of the user 20 (step 1104C). More specifically, in one embodiment, the current location of the user 20 is stored in the user record of the user 20 maintained in the datastore 64 of the MAP server 12. Note that, in the preferred embodiment, only the current location of the user 20 is stored in the user record of the user 20. In this manner, the MAP server 12 maintains privacy for the user 20 since the MAP server 12 does not maintain a historical record of the location of the user 20. As discussed below in detail, historical data maintained by the MAP server 12 is preferably anonymized in order to maintain the privacy of the users 20.

As discussed above, the use of the location server 16 is particularly beneficial when the mobile device 18 does not permit background processes. As such, if the mobile device 18 does not permit background processes, the MAP application 32 will not provide location updates for the user 20 to the location server 16 unless the MAP application 32 is active. However, other applications running on the mobile device 18 (or some other device of the user 20) may provide location updates to the location server 16 for the user 20 when the MAP application 32 is not active. This is illustrated in step 1106 where the location server 16 receives a location update for the user 20 from another application running on the mobile device 18 or an application running on another device of the user 20 (step 1106A). The location server 16 then provides the location update for the user 20 to the MAP server 12 (step 1106B). In response, the location manager 54 updates and stores the current location of the user 20 in the user record of the user 20 (step 1106C). In this manner, the MAP server 12 is enabled to obtain location updates for the user 20 even when the MAP application 32 is not active at the mobile device 18.

Figure 6:
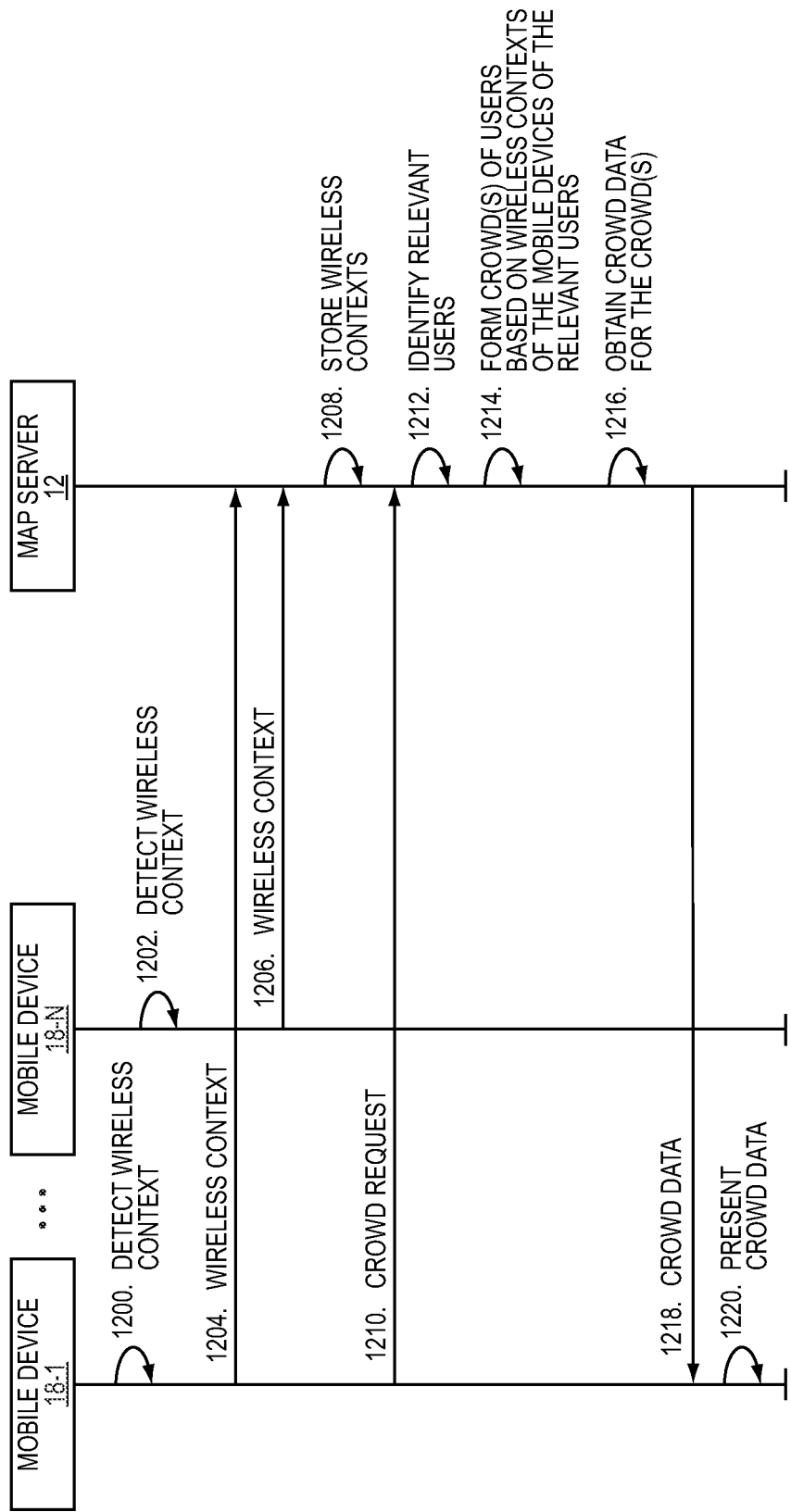
FIG. 6 illustrates the operation of the system of FIG. 1 to perform a crowd formation process based on wireless context data in response to a crowd request from one of the mobile devices of FIG. 1 according to one embodiment of the present disclosure.

FIG. 6 illustrates the operation of the MAP server 12 to form crowds of users based on wireless contexts of the mobile devices 18 of the users 20 in response to receiving a crowd request according to one embodiment of the present disclosure. Note that while receiving a crowd request triggers the crowd formation process in this exemplary embodiment, the present disclosure is not limited thereto. The crowd formation process may alternatively be performed in response to other triggering events such as, but not limited to, receiving a location update from any one of the users 20.

In this embodiment, the mobile devices 18 detect their wireless contexts (steps 1200 and 1202) and report their wireless contexts to the MAP server 12 (steps 1204 and 1206). Note that in order to preserve privacy, the mobile devices 18 may hash or otherwise encrypt their wireless contexts (e.g., hash or encrypt an identifier of each detected PAN-enabled device). If hashing is used, the same hashing scheme is used by each of the mobile devices 18 in order to ensure that, for example, an identifier of a particular PAN-enabled device detected by multiple mobile devices 18 hashes to the same unique value. This hashing scheme may be predetermined, based on location, or agreed upon by the mobile devices 18 in an ad-hoc manner.

As used herein, a wireless context of a mobile device 18 is a wireless PAN context of the mobile device 18, a wireless LAN context of the mobile device 18, or both the wireless PAN and the wireless LAN contexts of the mobile device 18. In one embodiment, the wireless PAN context of the mobile device 18 includes a list of PAN-enabled devices detected within range of the mobile device 18 and, optionally, one or more quality metrics for each of the detected PAN-enabled devices. In one embodiment, the mobile device 18 detects the PAN-enabled devices by first broadcasting a discovery request. In response, the PAN-enabled devices within range of the mobile device 18 respond with their device identifiers (IDs) (e.g., Bluetooth® IDs). The detected PAN-enabled devices may be other mobile devices 18 that are PAN-enabled and detected by a PAN component (e.g., a Bluetooth® transceiver) of the mobile device 18. In addition or alternatively, the detected PAN-enabled devices may include devices that are not part of the system 10 (i.e., the mobile device 18 may detect PAN-enabled devices that are not other mobile devices 18). Note that, in one preferred embodiment, the PAN components of the mobile device 18 and the detected PAN-enabled devices are power class 2 Bluetooth® transceivers having a range of about 10 meters. The quality metric may vary depending on the particular PAN type (e.g., Bluetooth® PAN, IEEE 802.15.4a PAN, Zigbee® PAN, or the like). The quality metric for each of the detected PAN-enabled devices is generally a metric that is indicative of a quality of a signal received by the mobile device 18 from the PAN-enabled device and/or a connection between the mobile device 18 and the PAN-enabled device. For example, the quality metric for each of the detected PAN-enabled devices may be a Received Signal Strength Indicator (RSSI) for a PAN connection between the mobile device 18 and the detected PAN-enabled device (also referred to herein as a connection-oriented RSSI), an Inquiry-based Receive (RX) Power Level (also referred to herein as a connectionless RSSI), a Link Quality indicator (LQ), or the like. Note that, with respect to the mobile devices 18 that are PAN-enabled, the MAP server 12 may store the PAN device identifiers (e.g., Bluetooth® IDs) of the mobile devices 18 in the user profiles of the corresponding users 20 in order to assist in the crowd formation process. However, this is optional.

In one embodiment, a wireless LAN context of a mobile device 18 includes a wireless LAN identifier and a quality metric for each of one or more wireless LANs detected by the mobile device 18. Each wireless LAN may be, for example, a Wi-Fi® network. In addition, if the mobile device 18 is connected to a particular wireless LAN, the wireless LAN context may identify one of the one or more wireless LANs detected by the mobile device 18 as the wireless LAN to which the mobile device 18 is connected. As used herein, a wireless LAN identifier is any information that uniquely identifies the wireless LAN or access point for the wireless LAN such as, for example, a Service Set Identifier (SSID) of the wireless LAN, a Media Access Control (MAC) address of the access point of the wireless LAN, or the like. The quality metric for each wireless LAN is preferably an RSSI value for the wireless LAN at the mobile device 18. Note, however, that other quality metrics may additionally or alternatively be used. For example, in addition to or as an alternative to RSSI, Signal to Noise Ratio (SNR), Link Quality Indicator (LQI), Packet Reception Rate (PRR), and/or Bit Error Rate (BER) may be included in the wireless context for each wireless PAN and/or wireless LAN detected by the mobile device 18.

Once the mobile devices 18 have detected their wireless contexts, the mobile devices 18 report their wireless contexts to the MAP server 12. In one embodiment, the mobile devices 18 periodically detect their wireless contexts and report their wireless contexts to the MAP server 12. In another embodiment, the mobile devices 18 periodically detect their wireless contexts and then report their wireless contexts (or updates to their wireless contexts) to the MAP server 12 only if there is a change to their wireless contexts. In another embodiment, the detection and reporting of the wireless contexts of the mobile devices 18 is synchronized. More specifically, some technologies have a relatively long inquiry, or discovery, time. For example, Bluetooth® devices require at least 10.24 seconds to reliably detect all nearby devices. Hence, if discovery is not synchronized, the time taken for N Bluetooth-enabled devices to detect one another is N×10.24 seconds in the worst case scenario. If the number of Bluetooth-enabled devices is large, then the Bluetooth® contexts of the devices may be out-of-date, or stale, by the time that all of the nearby devices have detected and reported their wireless contexts. This issue may be addressed by synchronizing the detection of the wireless contexts of the mobile devices 18.

In one embodiment, wireless context detection may be synchronized by defining a synchronized schedule at which the mobile devices 18 detect their wireless contexts. For example, all of the mobile devices 18 may detect their wireless contexts every $10^{th}$ minute of every hour (e.g., 12:00 PM, 12:10 PM, 12:20 PM, etc.). In another embodiment, the MAP server 12 may synchronize wireless context discovery by, for example, simultaneously requesting that all of the mobile devices 18 at a particular location or POI detect and report their wireless contexts to the MAP server 12. The MAP server 12 may do so periodically. The MAP server 12 may maintain a schedule defining times at which the MAP server 12 is to request wireless context data for particular locations or POIs. In yet another embodiment, one of the mobile devices 18 at a particular location or POI may instruct all of the mobile devices 18 nearby to simultaneously detect their wireless contexts and report their wireless contexts to the MAP server 12. The nearby mobile devices 18 may be those mobile devices 18 within PAN communication range of the mobile device 18. After the mobile devices 18 have reported their wireless contexts to the MAP server 12, the wireless contexts of the mobile devices 18 are stored at the MAP server 12 (step 1208). Preferably, the MAP server 12 stores the wireless contexts of the mobile devices 18 as they are received rather than waiting until all wireless contexts are received before storing the wireless contexts. Note that while only two of the mobile devices 18 are illustrated, it is to be understood that all of the mobile devices 18, or at least those mobile devices 18 that are PAN and/or wireless LAN enabled, detect their wireless contexts.

In this embodiment, the mobile device 18-1 sends a crowd request to the MAP server 12 (step 1210). Note that while in this example the crowd request originates from the mobile device 18-1 of the user 20-1, this discussion is equally applicable to crowd requests that originate from the mobile devices 18 of any of the users 20 or the subscriber device 22 of the subscriber 24. The crowd request is a request for crowd data for crowds currently located near a specified POI or within a specified AOI. The crowd request may be initiated by the user 20-1 of the mobile device 18-1 via the MAP application 32-1 or may be initiated automatically by the MAP application 32-1 in response to an event such as, for example, start-up of the MAP application 32-1, movement of the user 20-1, or the like.

In one embodiment, the crowd request is for a POI, where the POI is a POI corresponding to the current location of the user 20-1, a POI selected from a list of POIs defined by the user 20-1, a POI selected from a list of POIs defined by the MAP application 32-1 or the MAP server 12, a POI selected by the user 20-1 from a map, a POI implicitly defined via a separate application (e.g., the POI is implicitly defined as the location of the nearest Starbucks® coffee house in response to the user 20-1 performing a Google search for "Starbucks"), or the like. If the POI is selected from a list of POIs, the list of POIs may include static POIs which may be defined by street addresses or latitude and longitude coordinates, dynamic POIs which may be defined as the current locations of one or more friends of the user 20-1, or both. Note that in some embodiments, the user 20-1 may be enabled to define a POI by selecting a crowd center of a crowd as a POI, where the POI would thereafter remain static at that point and would not follow the crowd.

In another embodiment, the crowd request is for an AOI, where the AOI may be an AOI of a predefined shape and size centered at the current location of the user 20-1, an AOI selected from a list of AOIs defined by the user 20-1, an AOI selected from a list of AOIs defined by the MAP application 32-1 or the MAP server 12, an AOI selected by the user 20-1 from a map, an AOI implicitly defined via a separate application (e.g., the AOI is implicitly defined as an area of a predefined shape and size centered at the location of the nearest Starbucks® coffee house in response to the user 20-1 performing a Google search for "Starbucks"), an AOI corresponding to a geographic region displayed in a map currently presented to the user 20-1 at the mobile device 18-1, or the like. If the AOI is selected from a list of AOIs, the list of AOIs may include static AOIs, dynamic AOIs which may be defined as areas of a predefined shape and size centered at the current locations of one or more friends of the user 20-1, or both. Note that in some embodiments, the user 20-1 may be enabled to define an AOI by selecting a crowd such that an AOI is created of a predefined shape and size centered at the crowd center of the selected crowd. The AOI would thereafter remain static and would not follow the crowd. The POI or the AOI of the crowd request may be selected by the user 20-1 via the MAP application 32-1. In yet another embodiment, the MAP application 32-1 automatically uses the current location of the user 20-1 as the POI or as a center point for an AOI of a predefined shape and size.

Upon receiving the crowd request, the MAP server 12, and specifically the crowd analyzer 58 of the MAP server 12, identifies one or more of the users 20 that are relevant to the crowd request (hereinafter referred to as "relevant users") (step 1212). In this embodiment, the relevant users are users currently located within a bounding region determined for the crowd request. If the crowd request is for a POI, then the bounding region may be a geographic area of a predefined shape and size that is centered at or that otherwise encompasses the POI. For example, the bounding region for a POI may correspond to known or expected physical boundaries of the POI (e.g., walls of a building corresponding to the POI) plus a predefined buffer that, for example, accounts for an error of the location functions 36 of the mobile devices 18. As a specific example, GPS receivers may have an error of up to 30 meters (m), and the POI may be a 40 m×40 m building. As such, each side of the 40 m×40 m box may be extended by 30 m to provide the bounding region as a 100 m×100 m geographic region centered at the POI. As another example, the bounding region for a POI may be a geographic region of a predefined shape and size that is the same for all POIs. If the crowd request is for an AOI, the bounding region may be the AOI. Alternatively, the AOI may be extended to include a buffer that, for example, accounts for an error of the location functions 36 of the mobile devices 18. As an example, if the AOI is a circular area having a radius of 200 m and the location functions 36 are GPS receivers having an error of up to 30 m, then the bounding region for the crowd request may be provided by extending the radius of the AOI by 30 m to provide the bounding region.

While in this embodiment the relevant users are identified based on the current locations of the users 20 as indicated by the location updates from the mobile devices 18 of the users 20, the present disclosure is not limited thereto. In another embodiment, the relevant users may be identified utilizing a manual check-in feature, which may be provided by the MAP server 12 or a third party. For example, the check-in feature may be, or be similar to, the FourSquare™ mobile check-in application. More specifically, the relevant users may be those users currently checked-in to the POI for the crowd request or users currently checked-in to one or more POIs within the AOI for the crowd request. Once a crowd is formed, the check-in location for any one of the users 20 in the crowd may be attributed to the other users 20 in the crowd. This may be true whether the relevant users are identified based on the current locations of the users 20 as indicated by the location updates from the mobile devices 18 of the users 20 or based on manual check-in locations of the users 20.

Once the relevant users are identified, the crowd analyzer 58 of the MAP server 12 forms one or more crowds of users from the relevant users based on the wireless contexts of the relevant users (step 1214). As discussed below in detail, the crowd analyzer 58 groups the relevant users into crowds that have similar wireless contexts. In other words, the users 20 of the mobile devices 18 that have similar wireless contexts are determined to be in the same crowd. Once the one or more crowds are formed, the crowd analyzer 58 obtains crowd data for the one or more crowds (step 1216). For each crowd, the crowd data for the crowd generally includes information about the crowd such as, for example, an aggregate profile for the crowd. The aggregate profile of a crowd may be generated based on a comparison of the user profile of the user 20-1, or one or more select profile categories from the user profile of the user 20-1, to the user profiles of the users 20 in the crowd. For instance, the aggregate profile of a crowd may include:

a total number of user matches over all keywords in the user profile of the user 20-1 or over all keywords in the one or more select profile categories of the user profile of the user 20-1 (i.e., the number of the users 20 in the crowd having user profiles that include at least one keyword that matches at least one keyword in the user profile of the user 20-1 or a select subset thereof), a ratio of the total number of user matches over the total number of users 20 in the crowd, a number of user matches for each keyword in the user profile of the user 20-1 or each keyword in the one or more select profile categories of the user profile of the user 20-1 (i.e., for each keyword in the user profile of the user 20-1 or a select subset thereof, the number of the users 20 in the crowd having user profiles that include a keyword that matches the keyword from the user profile of the user 20-1), and/or a match score that is indicative of the degree of similarity between the users 20 in the crowd and the user 20-1 (e.g., the ratio of the total number of user matches over the total number of users 20 in the crowd multiplied by 100 or a weighted average of the number of user matches for the individual keywords in the user profile of the user 20-1 or a select subset thereof).

Next, the MAP server 12 returns the crowd data for the one or more crowds to the mobile device 18-1 (step 1218). The MAP application 32-1 of the mobile device 18-1 then presents the crowd data to the user 20-1 (step 1220). The manner in which the crowd data is presented depends on the particular implementation of the MAP application 32-1. In one embodiment, the crowd data is overlaid upon a map. For example, the crowds may be represented by corresponding indicators overlaid on a map. The user 20-1 may then select a crowd in order to view additional crowd data regarding that crowd such as, for example, the aggregate profile of that crowd, characteristics of that crowd, or the like.

Figure 7:
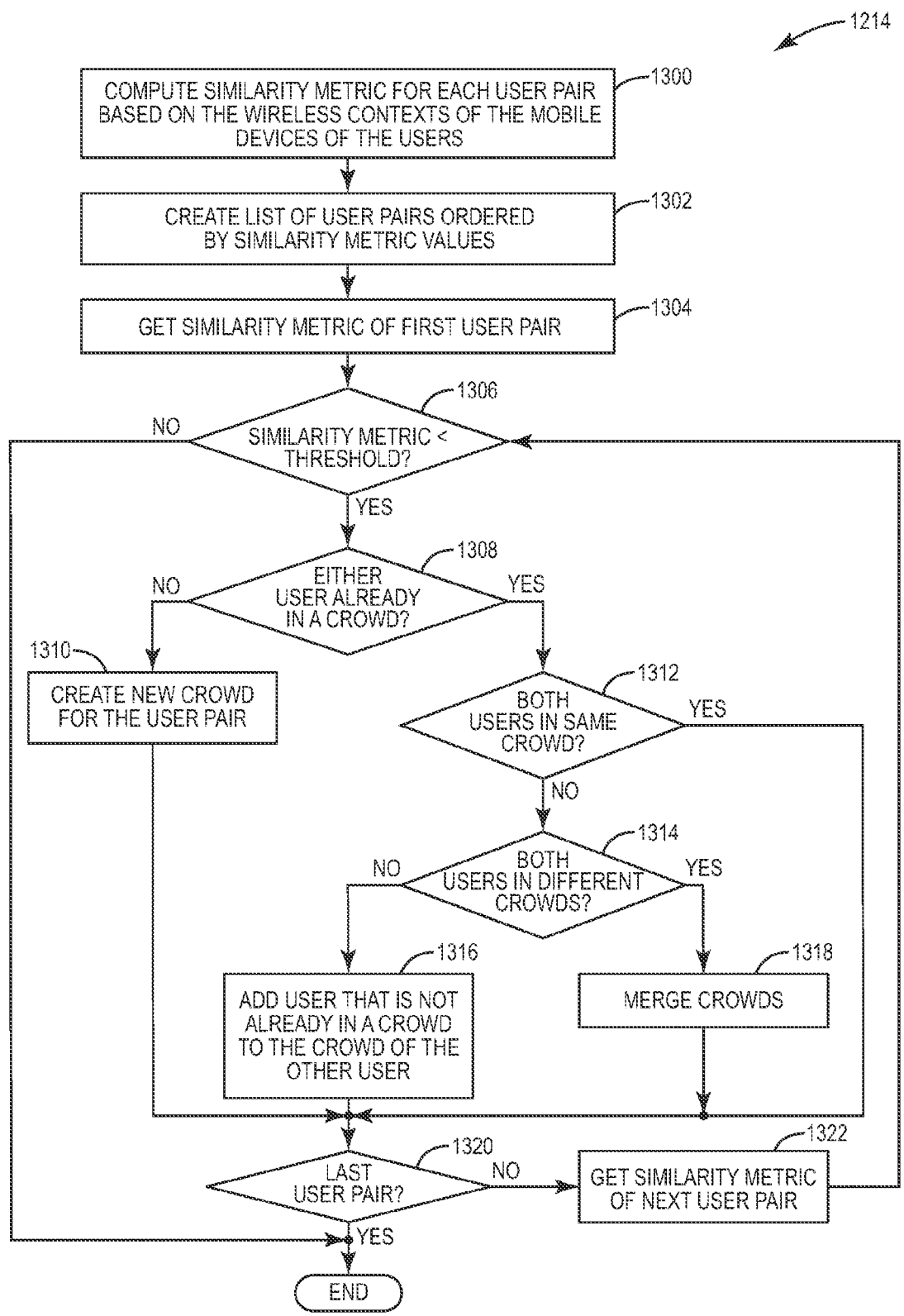
FIG. 7 illustrates a process for forming crowds of users based on the wireless contexts of the corresponding mobile devices according to one embodiment of the present disclosure.

FIG. 7 illustrates step 1214 of FIG. 6 in more detail according to one embodiment of the present disclosure. First, the crowd analyzer 58 of the MAP server 12 computes a similarity metric for each pair of the relevant users identified in step 1212 (also referred to herein as user pairs) based on the wireless contexts of the users (step 1300). For each user pair, the similarity metric for the user pair is indicative of a degree of similarity of the wireless context of the mobile device 18 of the first user in the user pair and the wireless context of the mobile device 18 of the second user in the user pair. In the embodiment described below, the lower the similarity metric the higher the similarity between the two wireless contexts.

Next, the crowd analyzer 58 utilizes a clustering scheme to form crowds of users based on the similarity metrics of the user pairs such that crowds of users having similar wireless contexts are formed. In this exemplary embodiment, clustering begins by the crowd analyzer 58 creating a list of the user pairs in which the user pairs are ordered by their similarity metric values (step 1302). Preferably, the list of user pairs is ordered from the user pair having the lowest similarity metric (i.e., the highest similarity) to the user pair having the highest similarity metric (i.e., the lowest similarity). Note that the crowd analyzer 58 may create more than one list and apply the clustering scheme described below to each list separately. This may be done, for instance, to reduce the computational cost for very large lists, such as lists generated for large and crowded POIs such as a concert. In one embodiment, the list may be split into smaller lists based on one or more wireless context parameters using any of the clustering or partitioning algorithms known in the art. For example, the list may be split based on PAN device IDs or Wi-Fi® SSIDs detected in the wireless contexts of mobile devices 18. If two mobile devices 18 have no detected PAN device IDs and/or Wi-Fi SSIDs in common, it can be reasonably assumed that they are too far apart to belong to the same crowd, and hence may be put into separate sub-lists. The crowd analyzer 58 then gets the similarity metric for the first user pair in the ordered list of user pairs (step 1304). The crowd analyzer 58 then determines whether the similarity metric is less than a predetermined threshold value (step 1306). Preferably, the predetermined threshold value is a system-defined value. The predetermined threshold value controls the degree to which the wireless contexts of the mobile devices 18 of two users in the user pair must match before the two users are included in the same crowd of users. If the similarity metric is not less than the predetermined threshold value, the crowd formation process ends.

Note that while not illustrated, in step 1306, the crowd analyzer 58 may optionally also determine whether one or more secondary factors indicate that the pair of users are to be included in the same crowd. For example, if the two users in the user pair are direct friends in a social network, then the crowd analyzer 58 may determine that the two users are to be included in the same crowd or are more likely to be in the same crowd even if the similarity metric for the two users is not less than the predetermined threshold value. As one alternative, the predetermined threshold value may be dynamically adjusted if the two users in the user pair are direct friends in a social network such that the two users are included in the same crowd or are more likely to be in the same crowd. As another example, if the two users in the user pair are currently connected to the same wireless LAN as opposed to merely detecting the same wireless LAN, then the crowd analyzer 58 may determine that the two users are to be included in the same crowd even if the similarity metric for the two users is not less than the predetermined threshold value. As yet another example, the one or more secondary factors may include one or more factors from a third party. For example, the crowd analyzer 58 may provide the wireless contexts of the pair of users to a third party and receive one or more factors indicating whether the pair of users are likely in the same crowd based on the wireless contexts of the pair of users. As a specific example, the crowd analyzer 58 may provide the wireless contexts of the pair of users to SkyHook (or a similar service that has geographically mapped Wi-Fi® networks) and, in response, receive information indicating whether the pair of users are likely located sufficiently near one another to be considered to be part of the same crowd. Thus, in this alternative embodiment, the crowd analyzer 58 determines whether the similarity metric for the user pair is less than the predetermined threshold value or whether there are one or more secondary factors that indicate that the two users in the user pair are to be included in the same crowd. If either of those is true, then the process proceeds to step 1308.

Returning to the embodiment illustrated in FIG. 7, if the similarity metric for the user pair is less than the predetermined threshold value, then the crowd analyzer 58 determines whether either of the users in the user pair is already in a crowd (step 1308). If not, the crowd analyzer 58 creates a new crowd for the user pair (step 1310). More specifically, the crowd analyzer 58 preferably creates a crowd record that represents the new crowd and stores the new crowd record at the MAP server 12. The crowd record for the new crowd preferably includes a list of users in the crowd. At this point, the users in the user pair are the only users in the crowd. As such, only the users in the user pair are stored in the list of users in the crowd record for the new crowd. Once the new crowd is created, the process proceeds to step 1320.

Returning to step 1308, if one or both of the users in the user pair is already in a crowd, the crowd analyzer 58 determines whether both of the users in the user pair are already included in the same crowd (step 1312). If so, the process proceeds to step 1320. If both of the users are not already included in the same crowd, the crowd analyzer 58 determines whether the users in the user pair are already included in two different crowds (step 1314). If not, then one of the users in the user pair is already included in a crowd while the other user in the user pair is not yet in a crowd. As such, the crowd analyzer 58 adds the user that is not already included in a crowd to the crowd of the other user in the user pair (step 1316). More specifically, in one embodiment, the user that is not already included in a crowd is added to the list of users in the crowd record of the crowd of the other user in the user pair. The process then proceeds to step 1320.

Returning to step 1314, if the users in the user pair are already included in two different crowds, then the crowd analyzer 58 merges the two crowds (step 1318). More specifically, in one embodiment, the crowd analyzer 58 merges the two crowds by adding the list of users stored in the crowd record of the crowd of one user in the user pair to the list of users stored in the crowd record of the crowd of the other user in the user pair and then deletes or otherwise discards the crowd record of the crowd that was merged into the other crowd. At this point, whether proceeding from step 1310, 1312, 1316, or 1318, the crowd analyzer 58 determines whether the last user pair in the ordered list of user pairs has been processed (step 1320). If not, the crowd analyzer 58 gets the similarity metric for the next user pair in the ordered list of user pairs (step 1322), and the process then returns to step 1306. Once the last user pair has been processed, the crowd formation process is complete. Note that, while not illustrated, the crowd analyzer 58 may optionally remove any crowds that do not have at least a predetermined minimum number of users. The minimum number of users may be any desired number greater than or equal to 2. For example, the minimum number of users may be 3. Also, note that the threshold may be dynamically adjusted, and steps 1300-1322 re-performed, if the number and size of crowds formed is deemed to be either too high or too low following a set of pre-determined heuristics. Alternatively, the threshold may be adjusted as the steps are performed. For example, in one embodiment, after step 1316, instead of adding the user not in a crowd to the crowd of the user that is already in the crowd, the two users may be split out into a separate crowd of their own depending on their similarity metrics (not shown in FIG. 7). In this case, the similarity metric of both users is compared to the similarity metrics of other users in the crowd, and if the similarity metrics of the two users are more similar to each other than those of the rest of the crowd, it may be assumed that they belong in a separate crowd. Hence, the crowd analyzer 58 may remove the user who is already included in a crowd from that crowd, and create a new crowd comprising the current pair of users. The crowd analyzer 58 may also use the difference between similarity metrics of the new crowd and the existing crowd to determine a new threshold value. In another embodiment, steps 1300-1322 may be performed recursively with the threshold being adjusted at each recursion and steps 1300-1322 operating on the crowds resulting from the previous recursion, thus allowing crowds of varying granularity to be formed. In yet another embodiment, a graph-theoretic approach may be used, where a graph is formed denoting the connectivity between mobile devices 18 as inferred from their detected PAN device IDs and quality metrics. In this embodiment, a graph is constructed with nodes representing mobile devices 18 and identified by their corresponding PAN device IDs. Edges are created between the nodes for each mobile device 18 and the nodes for PAN device IDs that the mobile device 18 has detected. The edges may be weighted using wireless quality metrics such as RSSI. Then, any of the graph partitioning or graph clustering algorithms known in the art may be applied to this graph to create sub-graphs that represent crowds. In an alternative embodiment, methods such as locality sensitive hashing may be employed, where devices having similar wireless contexts data hash to the same buckets, which represent crowds. Note that any other clustering methods known in the art may be employed in addition to or instead of the steps described in FIG. 7.

Figure 8:
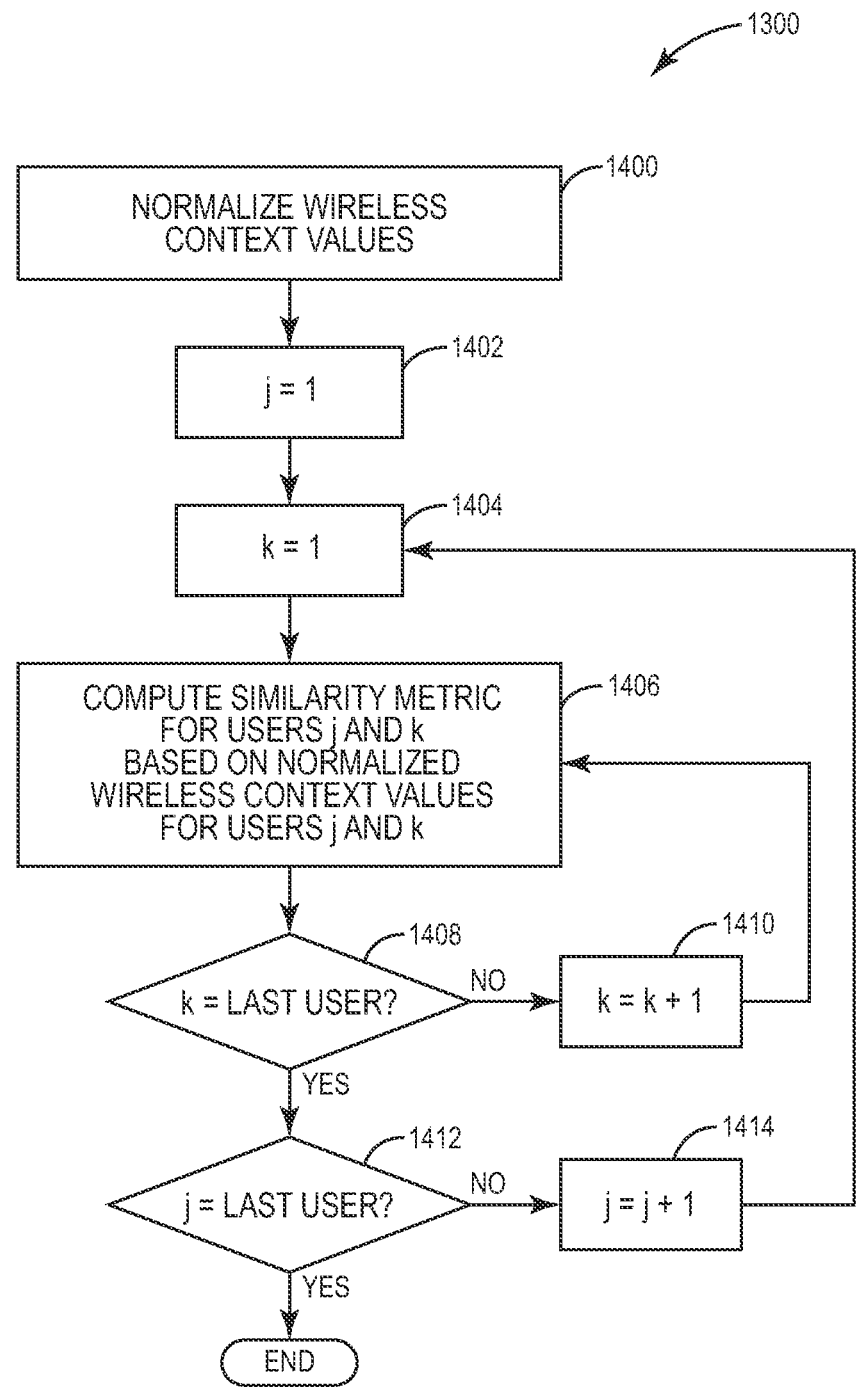
FIG. 8 illustrates a process for generating similarity metrics for pairs of users based on the wireless contexts of the corresponding mobile devices according to one embodiment of the present disclosure.

FIG. 8 illustrates step 1300 of FIG. 7 in more detail according to one embodiment of the present disclosure. In order to compute the similarity metrics for the user pairs, the crowd analyzer 58 first normalizes the wireless contexts of the relevant users (step 1400). Note that step 1400 is optional. Further, as an alternative, the wireless contexts may be normalized at the mobile devices 18. Also note that normalization may be performed for some wireless context parameters (e.g., RSSI) but not for other wireless context parameters (e.g., Bluetooth® ID). Normalization may be desirable, particularly for RSSI values, due to variances in RSSI values determined by different hardware manufactures. In one exemplary embodiment, a numerical value for a wireless context parameter (e.g., RSSI) in the wireless context of a mobile device 18 may be normalized based on the following equation:

$$NormalizedValue = \frac{Value - MIN}{MAX - MIN}$$

where Normalized Value is the normalized numerical value for the wireless context parameter of the mobile device 18 and Value is the numerical value for the wireless context parameter from the wireless context of the mobile device 18. Variables MAX and MIN are a maximum value and minimum value for the wireless context parameter, respectively. The maximum and minimum values may be practical maximum and minimum values for the wireless context parameter (e.g., for Bluetooth®, many devices report RSSI as a signed byte with a range of −127 to 127), historically observed maximum and minimum values for the wireless context parameter across all of the mobile devices 18, historically observed maximum and minimum values for the wireless context parameter for the wireless context of the mobile device 18, mobile device 18 or hardware specific maximum and minimum values for the wireless context parameter, or currently observed maximum and minimum values for the wireless context parameter for the mobile device 18.

Next, the crowd analyzer 58 sets a counter j to 1 (step 1402) and a counter k to 1 (step 1404). The crowd analyzer 58 then computes the similarity metric for a user pair formed by user j and user k from the relevant users for which the crowd formation process is being performed (i.e., the relevant users in the bounding region) based on the normalized wireless contexts of users j and k (step 1406). The similarity metric may be computed using any suitable scheme. One exemplary embodiment is described below. Once the similarity metric is computed, the crowd analyzer 58 determines whether user k is the last user of the relevant users (step 1408). If not, the counter k is incremented (step 1410), and the process returns to step 1406. Once similarity metrics have been computed for all user pairs including user j, the crowd analyzer 58 determines whether user j is the last user of the relevant users (step 1412). If not, counter j is incremented (step 1414) and the process returns to step 1404. The process continues until similarity metrics have been computed for all user pairs.

The following example illustrates the process of FIG. 8 according to one exemplary embodiment of the present disclosure. Note, however, that this example is for illustrative purposes and is not intended to limit the scope of the present disclosure. Table 1 below illustrates the wireless contexts of the mobile devices 18 of a group of relevant users (user 1 through user 5).

TABLE 1

| | User 1 | User 2 | User 3 | User 4 | User 5 | Coffee_Shop | Book_Store |
|---|---|---|---|---|---|---|---|
| User 1 | N/A | 15 | 10 | −30 | — | 40% | — |
| User 2 | −5 | N/A | −8 | — | — | 45% | — |
| User 3 | 10 | 12 | N/A | — | −40 | 42% | 10% |
| User 4 | −50 | — | −30 | N/A | 10 | 30% | 25% |
| User 5 | — | — | — | −5 | N/A | 31% | 28% |

As illustrated in Table 1, in this example, wireless contexts of the mobile devices 18 of user 1 through user 5 include wireless PAN contexts of the mobile devices 18 of user 1 through user 5 and wireless LAN contexts of the mobile devices 18 of user 1 through user 5. Specifically, in this example, the wireless PAN context of the mobile device 18 of user 1 lists the mobile devices 18 of users 2, 3, and 4 as a PAN-enabled devices detected by the mobile device 18 of user 1 with RSSI values of 15, 10, and −30, respectively. The mobile device 18 of user 1 did not detect the mobile device 18 of user 5 as indicated by the "−". Similarly, the wireless PAN context of the mobile device 18 of user 2 lists the mobile devices 18 of users 1 and 3 as PAN-enabled devices detected by the mobile device 18 of user 2 with RSSI values of −5 and −8, respectively. The mobile device 18 of user 2 did not detect the mobile devices 18 of users 4 and 5 as indicated by the "−". The wireless PAN context of the mobile device 18 of user 3 lists the mobile devices 18 of users 1, 2, and 5 as PAN-enabled devices detected by the mobile device 18 of user 3 with RSSI values of 10, 12, and −40, respectively. The mobile device 18 of user 3 did not detect the mobile device 18 of user 4 as indicated by the "−". The wireless PAN context of the mobile device 18 of user 4 lists the mobile devices 18 of users 1, 3, and 5 as PAN-enabled devices detected by the mobile device 18 of user 4 with RSSI values of −50, −30, and 10, respectively. The mobile device 18 of user 4 did not detect the mobile device 18 of user 2 as indicated by the "−". Lastly, the wireless PAN context of the mobile device 18 of user 5 lists the mobile devices 18 of user 4 as a PAN-enabled device detected by the mobile device 18 of user 5 with a RSSI value of −5. The mobile device 18 of user 5 did not detect the mobile devices 18 of users 1, 2, and 3 as indicated by the "−".

Table 1 also illustrates the wireless LAN contexts of the mobile devices of users 1 through 5. Specifically, in this example, the mobile device 18 of user 1 has detected the wireless LAN having the SSID "Coffee_Shop" with an RSSI value of 40% but did not detect the wireless LAN having the SSID "Book_Store" as indicated by the "−". Similarly, the mobile device 18 of user 2 has detected the wireless LAN having the SSID "Coffee_Shop" with an RSSI value of 45% but did not detect the wireless LAN having the SSID "Book_Store" as indicated by the "−". The mobile device 18 of user 3 has detected the wireless LAN having the SSID "Coffee_Shop" with an RSSI value of 42% and the wireless LAN having the SSID "Book_Store" with an RSSI value of 10%. The mobile device 18 of user 4 has detected the wireless LAN having the SSID "Coffee_Shop" with an RSSI value of 30% and the wireless LAN having the SSID "Book_Store" with an RSSI value of 25%. The mobile device 18 of user 5 has detected the wireless LAN having the SSID "Coffee_Shop" with an RSSI value of 31% and the wireless LAN having the SSID "Book_Store" with an RSSI value of 28%.

Next, the crowd analyzer 58 replaces N/A's in Table 1 with a maximum RSSI value, which for this example is the maximum RSSI currently included in the wireless contexts of the mobile devices 18 of the corresponding user plus 5. Undetected mobile devices 18 are assigned minimum RSSI values, which for this example is the minimum RSSI currently included in the wireless contexts of the mobile devices 18 of the corresponding user minus 10. Note that the values of +5 and −10 are exemplary and may be optimized based on heuristics or availability of wireless models. Similarly, undetected wireless LANs are assigned RSSI values of 0%. As a result, Table 1 becomes Table 2 below.

TABLE 2

| | User 1 | User 2 | User 3 | User 4 | User 5 | Coffee_Shop | Book_Store |
|---|---|---|---|---|---|---|---|
| User 1 | 20 | 15 | 10 | −30 | −40 | 40% | 0% |
| User 2 | −5 | 0 | −8 | −18 | −18 | 45% | 0% |
| User 3 | 10 | 12 | 17 | −50 | −40 | 42% | 10% |
| User 4 | −50 | −60 | −30 | 15 | 10 | 30% | 25% |
| User 5 | −15 | −15 | −15 | −5 | 0 | 31% | 28% |

Next, the PAN RSSI values in Table 2 are normalized to values between 0 and 1. In this example, the PAN RSSI values are normalized using device/user specific MAX and MIN values. Specifically, the PAN RSSI values for the wireless context of the mobile device 18 of user 1 are normalized using 20 as the MAX value and −40 as the MIN value. Likewise, the PAN RSSI values for the wireless context of the mobile device 18 of user 2 are normalized using 0 as the MAX value and −18 as the MIN value, etc. The wireless LAN RSSI values are scaled to values between 0 and 1. As a result, Table 2 becomes Table 3 below.

TABLE 3

| | User 1 | User 2 | User 3 | User 4 | User 5 | Coffee_Shop | Book_Store |
|---|---|---|---|---|---|---|---|
| User 1 | 1.00 | 0.92 | 0.83 | 0.17 | 0.00 | 0.4 | 0 |
| User 2 | 0.72 | 1.00 | 0.56 | 0.00 | 0.00 | 0.45 | 0 |
| User 3 | 0.90 | 0.93 | 1.00 | 0.00 | 0.15 | 0.42 | 0.1 |
| User 4 | 0.13 | 0.00 | 0.40 | 1.00 | 0.93 | 0.3 | 0.25 |
| User 5 | 0.00 | 0.00 | 0.00 | 0.67 | 1.00 | 0.31 | 0.28 |

Next, the similarity metric is computed for each user pair based on the following equation:

$$SimilarityMetric_{User\_j, User\_k} = \sum_{i=1}^{5} |RSSI_{User\_j, User\_i} - RSSI_{User\_k, User\_i}|.$$

Note that weights may be used to adjust the relative importance of the different RSSI values (e.g., wireless LAN RSSI values may be assigned greater weights than wireless PAN RSSI values). Using the equation above, for the user pair of user 1 and user 2, the similarity metric is computed as:

SimilarityMetric$_{User\_1, User\_2}$=|1.00−0.72|+|0.92−1.00|+|0.83−−0.56|+|0.17−0.00|+|0.00−0.00|+|0.40−0.45|+|0.00−0.00|SimilarityMetric$_{User\_1, User\_2}$=0.85.

Likewise, the similarity metric for the user pair of user 1 and user 3 is computed as:

SimilarityMetric$_{User\_1, User\_3}$=|1.00−0.00|+|0.92−0.00|+|0.83−0.00|+|0.17−0.67|+|0.00−1.00|+|0.40−0.31|+|0.00−0.28|SimilarityMetric$_{User\_1, User\_3}$=0.72.

Similarly, the similarity metric for the user pair of user 1 and user 5 is computed as:

SimilarityMetric$_{User\_1, User\_5}$=|1.00−0.00|+|0.92−0.00|+|0.83−0.00|+|0.17−0.67|+|0.00−1.00|+|0.40−0.31|+|0.00−0.28|SimilarityMetric$_{User\_1, User\_5}$=4.62.

It can be seen that the similarity metrics for users 1 and 3 are much closer to each other (0.85 and 0.72 respectively), as compared to the metrics for users 1 and 5 (0.85 and 4.62 respectively). Hence, users 1 and 3 should be in the same crowd, but in a separate crowd from user 5. These observations correlate to the similarity between the collected wireless context parameters in Table 1. Thus, it may be seen that by applying clustering methods on such wireless context-based similarity metrics it is possible to generate crowds from an otherwise amorphous group of users. The similarity metrics for the remaining user pairs (i.e., users 1 and 4, users 1 and 5, users 2 and 3, etc.) are computed in the same manner. Once the similarity metrics are computed, a clustering technique is utilized to group the relevant users into crowds of users having similar wireless contexts in the manner described above.

Note that there are numerous variations to the exemplary process described above as well as alternative embodiments that will be apparent to one of ordinary skill in the art upon reading this disclosure. As one exemplary variation, the similarity metrics of the user pairs may alternatively be computed based on comparisons of lists of detected users ordered based on RSSI values. In this manner, relative RSSI values, rather than specific RSSI values, are utilized for the comparison. Thus, using the example above, the ordered list for user 1 would be user 1, user 2, user 3, user 4, and user 5; the ordered list for user 2 would be user 2, user 1, user 3, user 4, and user 5; the ordered list for user 3 would be user 3, user 1, user 2, user 5, and user 4; the ordered list for user 4 would be user 4, user 5, user 3, user 1, and user 2, and the ordered list for user 5 would be user 5, user 4, user 1, user 2, and user 3. These ordered lists may then be compared using known list comparison schemes to provide similarity metrics for the user pairs. For example, the similarity metric of each user pair may be computed based on the similarity of vectors or strings representing the ordered lists of users for the users in the user pair determined using a technique such as, for example, Hamming distance for binary strings, Cosine Similarity for vectors, or Levenshtein distance for text strings.

As another exemplary variation, for each user pair, separate similarity metrics may be computed for each network (e.g., a PAN similarity metric for wireless PAN contexts and a LAN similarity metric for wireless LAN contexts). Then, for each user pair, the separate similarity metrics may be combined via, for example, a weighted average in order to provide the similarity metric for the user pair.

As yet another example, the mobile devices 18 may form ad-hoc PANs such as, for example, Bluetooth® piconets. In this case, for each such ad-hoc network, one of the mobile devices 18 may serve as a master device of the ad-hoc network and operate to collect the identifiers of the other mobile devices 18 in the ad-hoc network and report the collected identifiers to the MAP server 12. The MAP server 12 may then utilize the reported identifiers as the wireless PAN contexts of all of the mobile devices 18 in the ad-hoc network and process the wireless PAN contexts of the mobile devices 18 according to the crowd formation process of FIGS. 7 and 8. Alternatively, the MAP server 12 may automatically form a crowd for the users of the mobile devices 18 in a piconet. If there are additional relevant users, the crowd formation process of FIGS. 7 and 8 may then be performed to create additional crowds and/or to add additional users to the existing crowd created for the users in the ad-hoc network depending on the particular circumstances.

Lastly, it should be noted that FIGS. 7 and 8 illustrate an exemplary clustering algorithm for grouping, or clustering, users having similar wireless contexts into crowds of users. However, the present disclosure is not limited thereto. Other clustering techniques (e.g., correlation clustering) may be used to group users having similar wireless contexts into crowds of users.

Figure 9:
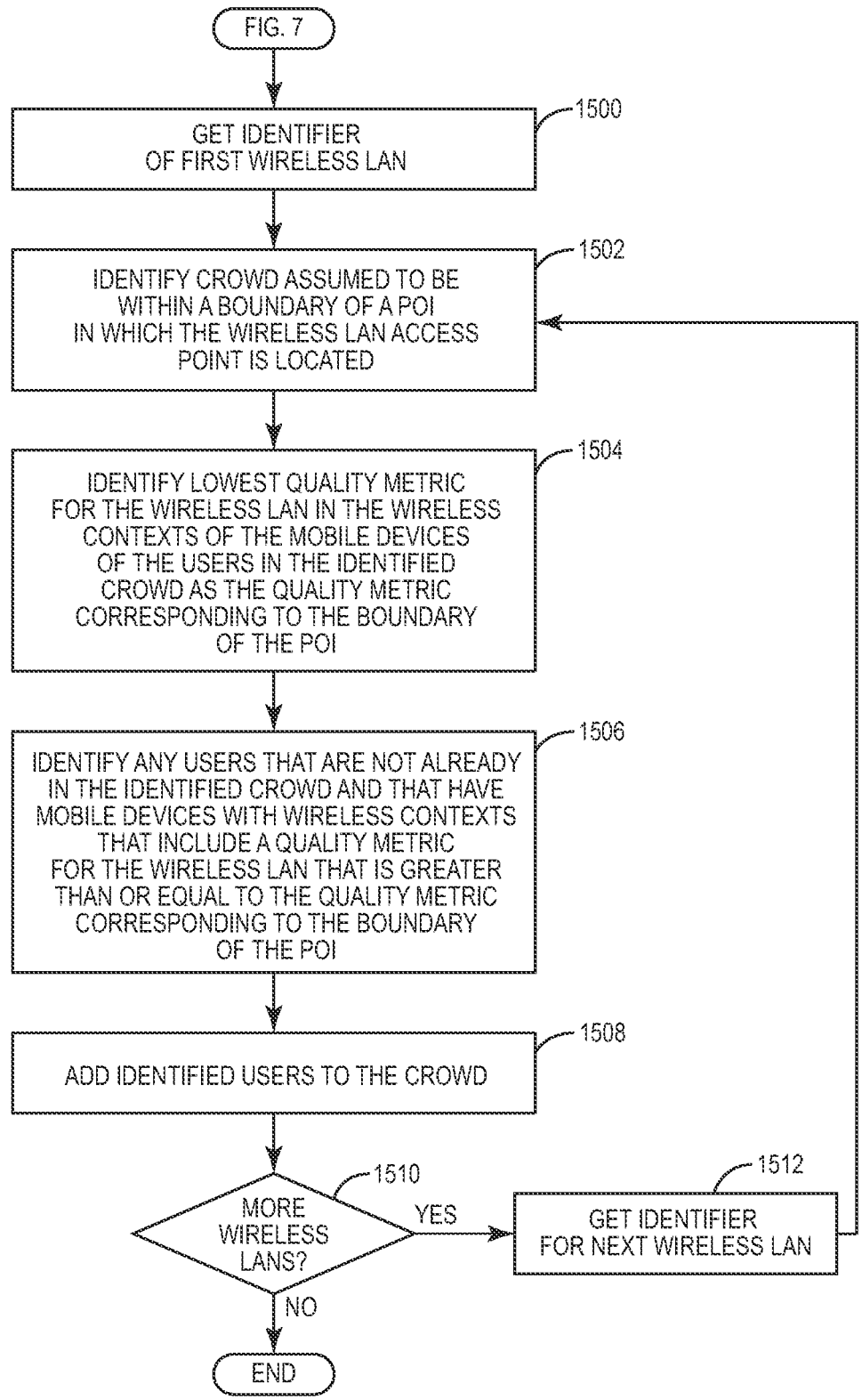
FIG. 9 illustrates a process for enhancing the crowd formation process of FIG. 7 according to one embodiment of the present disclosure.

FIG. 9 illustrates an additional process that may be performed after the process of FIG. 7 to further enhance the crowd formation process according to one embodiment of the present disclosure. This process is particularly beneficial where the wireless LAN(s) detected by the mobile devices 18 of the relevant users have access points located within corresponding POI(s) and where some of the mobile devices 18 are not PAN-enabled or for some other reason are unable to detect other PAN-enabled devices. First, the crowd analyzer 58 of the MAP server 12 gets the identifier of the first wireless LAN detected by any of the mobile devices 18 of the relevant users 20 (step 1500). Next, the crowd analyzer 58 identifies a crowd of users formed by the process of FIG. 7 that is assumed to be within a boundary of a POI in which the access point for the wireless LAN is located (step 1502). A crowd is assumed to be within the boundary of the POI if at least one user in the crowd has a wireless context that includes a quality metric for the wireless LAN that is greater than a predefined threshold (e.g., a RSSI for the wireless LAN that is greater than 80%). Next, the crowd analyzer 58 identifies the lowest quality metric for the wireless LAN in the wireless contexts of the mobile devices 18 of the users 20 in the identified crowd as a quality metric corresponding to the boundary of the POI (step 1504). For example, if the crowd has three users with RSSI values for the wireless LAN of 92%, 85%, and 80%, then the RSSI value of 80% may be identified as the quality metric corresponding to the boundary of the POI.

The crowd analyzer 58 then identifies any users that are not already in the identified crowd and that have mobile devices 18 with wireless contexts that include a quality metric for the wireless LAN that is greater than or equal to the quality metric corresponding to the boundary of the POI (step 1506). The crowd analyzer 58 then adds the identified users to the crowd (step 1508). Note that any users having mobile devices 18 that are not PAN-enabled would likely have wireless contexts that are not sufficiently similar to the wireless contexts of the other users in the crowd to be included in the crowd during execution of the process of FIG. 7. Steps 1502 through 1508 operate to identify users that should be included in the crowd located within the boundary of the POI but that have mobile devices 18 that are not PAN-enabled (and thus not included in the crowd) and then include those identified users in the crowd.

At this point, the crowd analyzer 58 determines whether there are more wireless LANs detected by the mobile devices 18 of any of the relevant users (step 1510). If so, the crowd analyzer 58 gets the identifier of the next wireless LAN detected by the mobile devices 18 of any of the relevant users (step 1512), and the process then returns to step 1502. Once all of the detected wireless LANs have been processed, the process ends.

Figure 10:
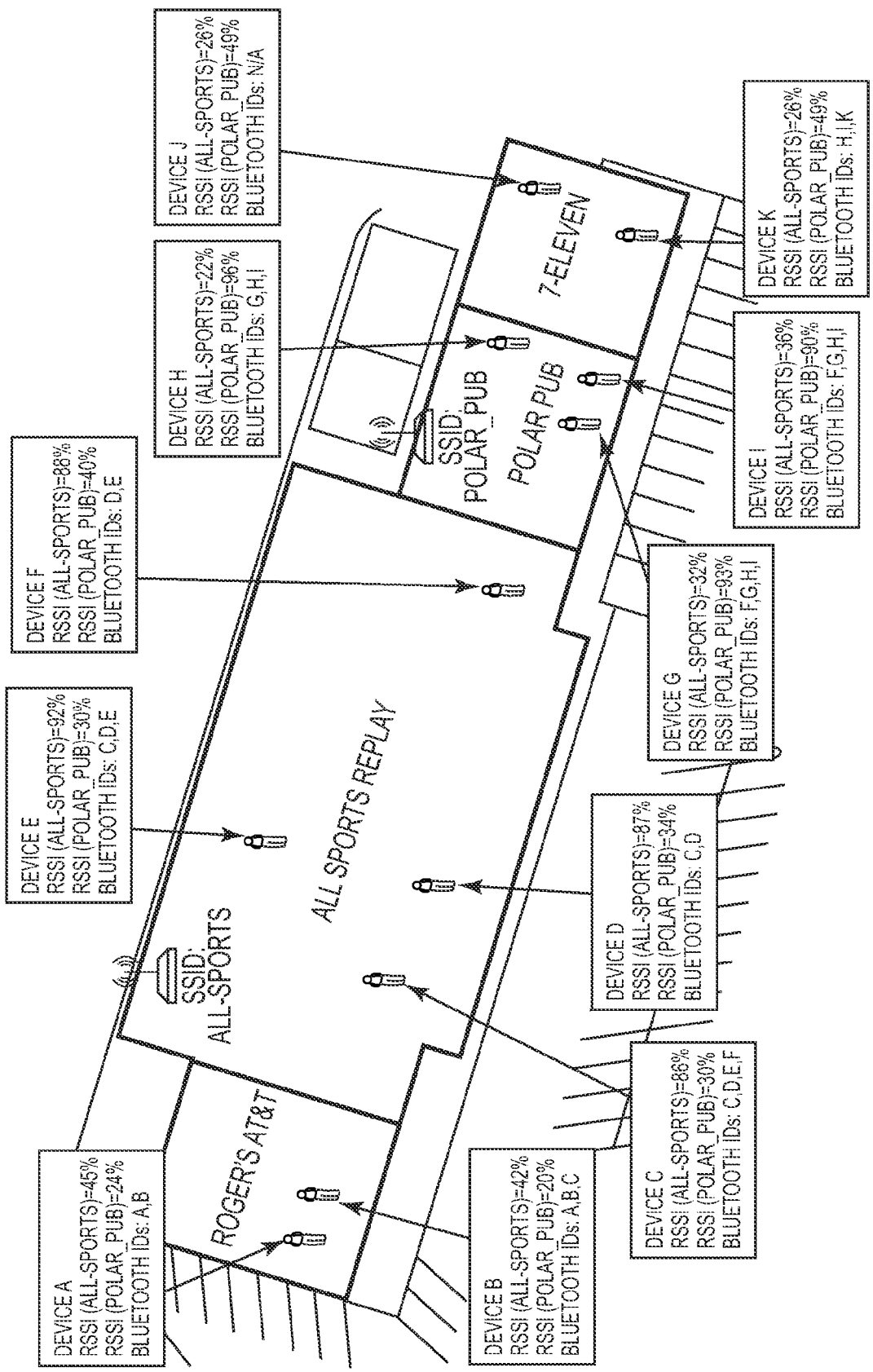
FIG. 10 illustrates an exemplary scenario for the crowd formation process of FIG. 7.

FIG. 10 graphically illustrates an exemplary scenario for the crowd formation process of FIG. 7. As illustrated, the crowd formation process is performed for a bounding region consisting of four POIs, namely, "Roger's AT&T," "All Sports Replay," "Polar Pub," and "7-Eleven." Two of the POIs, namely "All Sports Replay" and "Polar Pub," have corresponding Wi-Fi® networks. The relevant users (i.e., the users located in the bounding region) are the users of the mobile devices 18 identified in this example as Devices A through K. Here, Devices A through I and K are Bluetooth-enabled devices. Device J is not Bluetooth-enabled. As illustrated, in this example, the wireless contexts of Devices A through I and K include RSSI values for detected Wi-Fi® networks as well as Bluetooth® IDs of detected Bluetooth® devices. The wireless context of Device J includes only the RSSI values for the detected Wi-Fi® networks.

Using the wireless contexts, the users of Devices A and B are clustered together in a crowd because they have sufficiently similar RSSI readings for the detected Wi-Fi® networks and because they detect each other via Bluetooth®. Note that even though Device B detects Device C via Bluetooth®, the user of Device C is not included in the crowd with the users of Devices A and B because: (1) Device C has significantly different RSSI values, particularly for the "All-Sports" Wi-Fi® network and (2) Devices A and C do not detect one another via Bluetooth®. This results in a similarity metric for the users of Devices B and C that does not satisfy the threshold criterion for the users being included in the same crowd.

The users of Devices C, D, E, and F are clustered together to form another crowd because they have sufficiently similar wireless contexts. Specifically, in this example, Devices C, D, E, and F have very similar RSSI values for the detected Wi-Fi® networks, and each of the Devices C, D, E, and F detect at least one other of Devices C, D, E, and F. In a similar manner, the users of Devices G, H, and I are clustered to form yet another crowd because they have sufficiently similar wireless contexts. Specifically, Devices G, H, and I have similar RSSI values for the detected Wi-Fi® networks and detect one another via Bluetooth®. The users of Devices J and K are clustered to form a final crowd because they have similar RSSI values for the detected Wi-Fi® networks.

It should be noted that, based on the detected Bluetooth® IDs for each of the Devices A through I and K, the MAP server 12 can also infer the relative positions of the four crowds described above. Specifically, the MAP server 12 is enabled to determine that the crowd formed by the users of Devices A and B (crowd [A,B]) is close to the crowd formed by the users of Devices C, D, E, and F (crowd [C,D,E,F]). The MAP server 12 is further enabled to determine that crowd [A,B] is not close to the crowd formed by the users of Devices G, H, and I (crowd [G,H,I]) or the crowd formed by the users of Devices J and K (crowd [J,K]) because none of the Devices G through K in the later two crowds detect either Device A or Device B via Bluetooth®. Similarly, the MAP server 12 is enabled to determine that crowd [C,D,E,F] is close to crowd [G,H,I] but is not close to crowd [J,K], that crowd [G,H,I] is close to crowd [C,D,E,F] and crowd [J,K] but is not close to crowd [A,B], and that crowd [J,K] is close to crowd [G,H,I] but is not close to crowd [C,D,E,F] or crowd [A,B].

Figure 11:
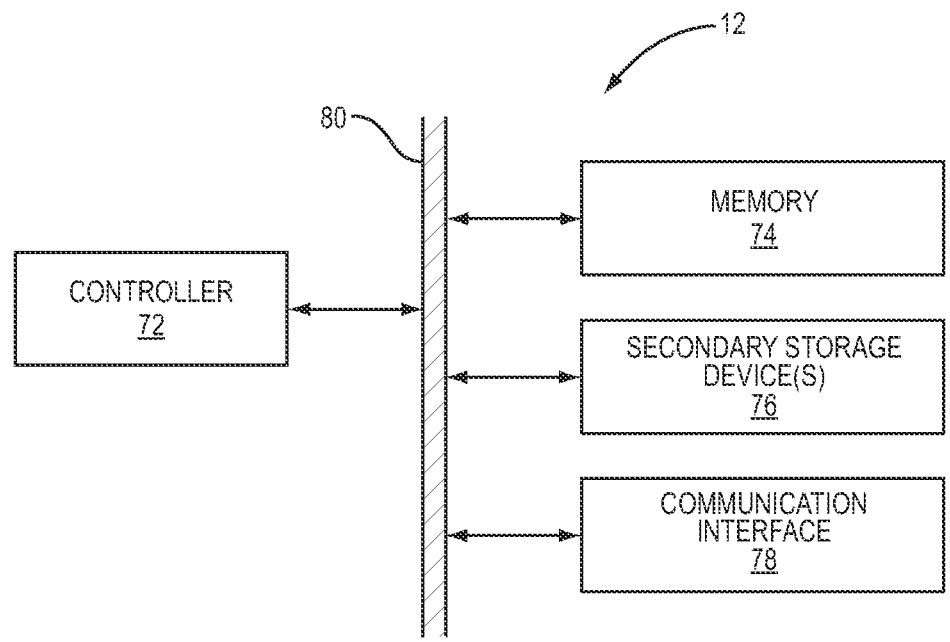
FIG. 11 is a block diagram of the MAP server of FIG. 1 according to one embodiment of the present disclosure.

FIG. 11 is a block diagram of the MAP server 12 according to one embodiment of the present disclosure. As illustrated, the MAP server 12 includes a controller 72 connected to memory 74, one or more secondary storage devices 76, and a communication interface 78 by a bus 80 or similar mechanism. The controller 72 is a microprocessor, digital Application Specific Integrated Circuit (ASIC), Field Programmable Gate Array (FPGA), or the like. In this embodiment, the controller 72 is a microprocessor, and the application layer 40, the business logic layer 42, and the object mapping layer 62 (FIG. 2) are implemented in software and stored in the memory 74 for execution by the controller 72. Further, the datastore 64 (FIG. 2) may be implemented in the one or more secondary storage devices 76. The secondary storage devices 76 are digital data storage devices such as, for example, one or more hard disk drives. The communication interface 78 is a wired or wireless communication interface that communicatively couples the MAP server 12 to the network 28 (FIG. 1). For example, the communication interface 78 may be an Ethernet interface, local wireless interface such as a wireless interface operating according to one of the suite of IEEE 802.11 standards, or the like.

Figure 12:
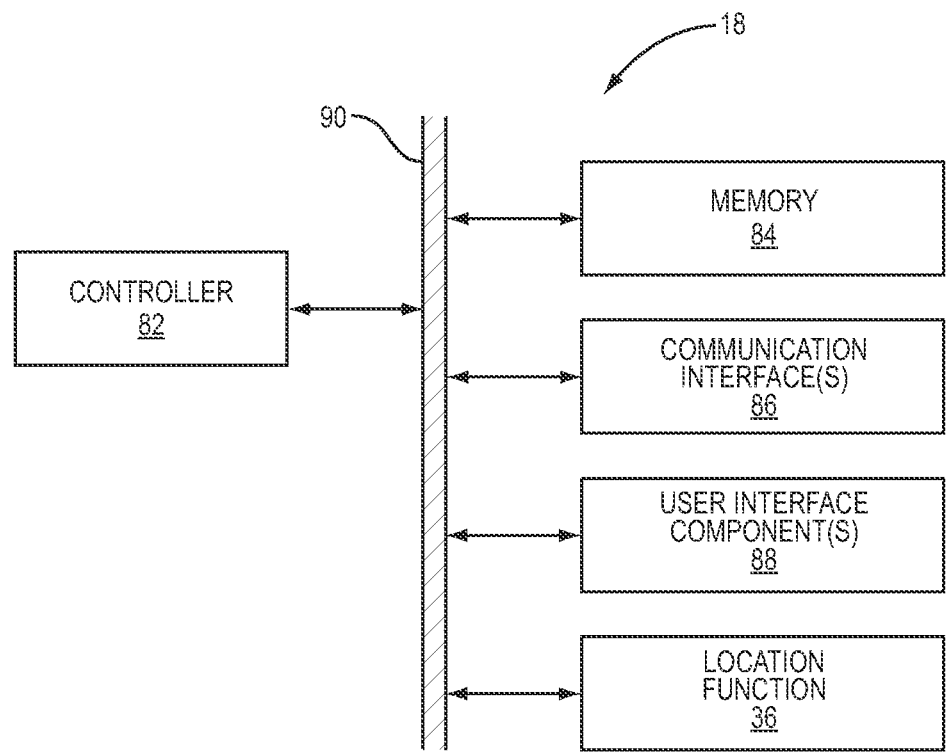
FIG. 12 is a block diagram of one of the mobile devices of FIG. 1 according to one embodiment of the present disclosure.

FIG. 12 is a block diagram of one of the mobile devices 18 of FIG. 1 according to one embodiment of the present disclosure. This discussion is equally applicable to the other mobile devices 18. As illustrated, the mobile device 18 includes a controller 82 connected to memory 84, one or more communication interfaces 86, one or more user interface components 88, and the location function 36 by a bus 90 or similar mechanism. The controller 82 is a microprocessor, digital ASIC, FPGA, or the like. In this embodiment, the controller 82 is a microprocessor, and the MAP client 30, the MAP application 32, and the third-party applications 34 are implemented in software and stored in the memory 84 for execution by the controller 82. In this embodiment, the location function 36 is a hardware component such as, for example, a GPS receiver. The one or more communication interfaces 86 include a wireless communication interface that communicatively couples the mobile device 18 to the network 28 (FIG. 1). For example, the one or more communication interfaces 86 may include a wireless LAN interface for connecting to the network 28 via an access point of a connected wireless LAN or a mobile communications interface. The wireless LAN interface may be, for example, a wireless interface operating according to one of the suite of IEEE 802.11 standards. The mobile communications interface is a cellular telecommunications interface operating according to a cellular communications standard such as, for example, a 3G or 4G cellular telecommunications standard (e.g., Global System for Mobile communications (GSM), Wideband Code Division Multiple Access (W-CDMA), or the like). In addition, the one or more communication interfaces 86 may include a wireless PAN interface such as, for example, a Bluetooth® interface or component, an IEEE 802.16.4 interface, or the like. The one or more user interface components 88 include, for example, a touchscreen, a display, one or more user input components (e.g., a keypad), a speaker, or the like, or any combination thereof.

The system 10 of the present disclosure provides substantial opportunity for variation without departing from the concepts described herein. For example, while the system 10 is described above as including the MAP server 12 that operates to form crowds of users, the present disclosure is not limited thereto. For example, the crowd formation process may be performed by the mobile devices 18 in a distributed manner. For example, the mobile devices 18, or at least some of the mobile devices 18, may collect the wireless contexts of nearby devices via their wireless PAN or wireless LAN interfaces. Each of those mobile devices 18 may then perform the crowd formation process described herein for the users 20 of the mobile devices 18 for which the mobile device 18 has collected wireless context data. The mobile device 18 may then utilize information regarding the resulting crowds locally at the mobile device 18 (e.g., present corresponding crowd data to the user 20 of the mobile device 18) and/or report the resulting crowds to other mobile devices 18, a server similar to the MAP server 12, a third-party service, or the like.

Those skilled in the art will recognize improvements and modifications to the preferred embodiments of the present disclosure. All such improvements and modifications are considered within the scope of the concepts disclosed herein and the claims that follow.

What is claimed is:

1. A computer implemented method comprising:
   obtaining wireless contexts of a plurality of mobile devices of a corresponding plurality of users, wherein for each mobile device of at least some of the plurality of mobile devices, the wireless context of the mobile device comprises a wireless Personal Area Network (PAN) context of the mobile device comprising information identifying one or more PAN-enabled devices detected by the mobile device and a quality metric for each of the one or more PAN-enabled devices detected by the mobile device; and
   forming one or more crowds of users based on the wireless contexts of the plurality of mobile devices.

2. The method of claim 1 wherein each crowd of the one or more crowds of users includes two or more users of the plurality of users.

3. The method of claim 1 wherein each crowd of the one or more crowds of users includes at least a predefined number of users of the plurality of users.

4. The method of claim 1 wherein the one or more PAN-enabled devices detected by the mobile device comprise one or more other mobile devices from the plurality of mobile devices that are PAN-enabled.

5. The method of claim 1 wherein the one or more PAN-enabled devices detected by the mobile device comprise one or more other mobile devices from the plurality of mobile devices that are PAN-enabled and one or more additional PAN-enabled devices.

6. The method of claim 1 wherein the one or more PAN-enabled devices detected by the mobile device are one or more PAN-enabled devices detected by a PAN component of the mobile device.

7. The method of claim 1 wherein, for each PAN-enabled device of the one or more PAN-enabled devices detected by the mobile device, the quality metric for the PAN-enabled device is a Received Signal Strength Indicator (RSSI) value.

8. The method of claim 1 wherein, for each PAN-enabled device of the one or more PAN-enabled devices detected by the mobile device, the quality metric for the PAN-enabled device is a connection-oriented Received Signal Strength Indicator (RSSI) for a PAN connection between the mobile device and the PAN-enabled device.

9. The method of claim 1 wherein, for each PAN-enabled device of the one or more PAN-enabled devices detected by the mobile device, the quality metric for the PAN-enabled device is a connectionless Received Signal Strength Indicator (RSSI) between the mobile device and the PAN-enabled device.

10. The method of claim 1 wherein, for each PAN-enabled device of the one or more PAN-enabled devices detected by the mobile device, the quality metric for the PAN-enabled device is a Signal to Noise Ratio (SNR) between the mobile device and the PAN-enabled device.

11. The method of claim 1 wherein, for each PAN-enabled device of the one or more PAN-enabled devices detected by the mobile device, the quality metric for the PAN-enabled device is a Link Quality Indicator (LQI) for a PAN link between the mobile device and the PAN-enabled device.

12. The method of claim 1 wherein, for each PAN-enabled device of the one or more PAN-enabled devices detected by the mobile device, the quality metric for the PAN-enabled device is a Packet Reception Rate (PRR) for a PAN connection between the mobile device and the PAN-enabled device.

13. The method of claim 1 wherein, for each PAN-enabled device of the one or more PAN-enabled devices detected by the mobile device, the quality metric for the PAN-enabled device is a Bit Error Rate (BER) for a PAN connection between the mobile device and the PAN-enabled device.

14. The method of claim 1 wherein the wireless PAN context of the mobile device further comprises a Bluetooth network context of the mobile device.

15. The method of claim 1 wherein the wireless PAN context of the mobile device further comprises an IEEE 802.15.4 network context of the mobile device.

16. The method of claim 1 wherein for each mobile device of the at least some of the plurality of mobile devices, the wireless context of the mobile device further comprises wireless Local Area Network (LAN) context of the mobile device.

17. A computer implemented method comprising:
obtaining wireless contexts of a plurality of mobile devices of a corresponding plurality of users, wherein for each mobile device of at least some of the plurality of mobile devices, the wireless context of the mobile device comprises a wireless Local Area Network (LAN) context of the mobile device comprising a quality metric for each wireless LAN of the one or more wireless LANs detected by the mobile device; and
form one or more crowds of users based on the wireless contexts of the plurality of mobile devices.

18. The method of claim 17 wherein for each mobile device of the at least some of the plurality of mobile devices, the wireless LAN context of the mobile device comprises information that identifies one or more wireless LANs detected by the mobile device.

19. The method of claim 18 wherein the information that identifies the one or more wireless LANs detected by the mobile device comprises, for each wireless LAN of the one or more wireless LANs, a Service Set Identifier (SSID) of the wireless LAN.

20. The method of claim 18 wherein the information that identifies the one or more wireless LANs detected by the mobile device comprises, for each wireless LAN of the one or more wireless LANs, a Media Access Control (MAC) address of a corresponding access point.

21. The method of claim 17 wherein for each wireless LAN of the one or more wireless LANs detected by the mobile device, the quality metric of the wireless LAN is a Received Signal Strength Indicator (RSSI) between the mobile device and an access point for the wireless LAN.

22. The method of claim 17 wherein for each wireless LAN of the one or more wireless LANs detected by the mobile device, the quality metric is a Signal to Noise Ratio (SNR) between the mobile device and an access point for the wireless LAN.

23. The method of claim 17 wherein for each wireless LAN of the one or more wireless LANs detected by the mobile device, the quality metric is a Packet Reception Rate (PRR) for a connection between the mobile device and an access point for the wireless LAN.

24. The method of claim 17 wherein for each wireless LAN of the one or more wireless LANs detected by the mobile device, the quality metric is a Bit Error Rate (BER) for a connection between the mobile device and an access point for the wireless LAN.

25. The method of claim 17 wherein the wireless LAN context of the mobile device is a Wi-Fi context of the mobile device.

26. The method of claim 17 wherein for each mobile device of the at least some of the plurality of mobile devices, the wireless context of the mobile device further comprises a wireless Personal Area Network (PAN) context of the mobile device.

27. A computer implemented method comprising:
obtaining wireless contexts of a plurality of mobile devices of a corresponding plurality of users; and
forming one or more crowds of users based on the wireless contexts of the plurality of mobile devices, wherein forming the one or more crowds of users comprises:
identifying a subset of the plurality of users as a plurality of relevant users;
computing a similarity metric for each pair of relevant users from the plurality of relevant users based on the wireless contexts of corresponding ones of the plurality of mobile devices; and
forming the one or more crowds of users based on the similarity metrics computed for the pairs of relevant users.

28. The method of claim 27 wherein forming the one or more crowds of users based on the similarity metrics computed for the pairs of relevant users comprises forming the one or more crowds of users such that ones of the plurality of relevant users of corresponding ones of the plurality of mobile devices that have sufficiently similar wireless contexts are combined to form a corresponding one of the one or more crowds of users.

29. The method of claim 27 wherein forming the one or more crowds of users based on the similarity metrics computed for the pairs of relevant users comprises, for each pair of relevant users from the plurality of relevant users:
  determining whether the similarity metric for the pair of relevant users indicates that the wireless contexts of corresponding mobile devices of the plurality of mobile devices are similar at least to a predefined threshold degree; and
  if the wireless contexts of the corresponding mobile devices are similar to at least the predefined threshold degree:
    if neither of the pair of relevant users is already in a crowd, creating a new crowd for the pair of relevant users;
    if the pair of relevant users are already in two different crowds, combining the two different crowds; and
    if a first user of the pair of relevant users is already in a crowd and a second user of the pair of relevant users is not already in a crowd, adding the second user to the crowd of the first user.

30. The method of claim 27 wherein identifying the subset of the plurality of users as the plurality of relevant users comprises:
  determining a bounding region for which crowds are to be formed; and
  identifying a subset of the plurality of users that are currently located within the bounding region as the plurality of relevant users.

31. A computing device comprising:
  a communication interface communicatively coupled to a network; and
  a controller associated with the communication interface and adapted to:
    obtain, via the network, wireless contexts of a plurality of mobile devices of a corresponding plurality of users, wherein for each mobile device of at least some of the plurality of mobile devices, the wireless context of the mobile device comprises a wireless Personal Area Network (PAN) context of the mobile device comprising information identifying one or more PAN-enabled devices detected by the mobile device and a quality metric for each of the one or more PAN-enabled devices detected by the mobile device; and
    form one or more crowds of users based on the wireless contexts of the plurality of mobile devices.

32. A non-transitory computer readable medium storing software for instructing a controller of a computing device to:
  obtain wireless contexts of a plurality of mobile devices of a corresponding plurality of users, wherein for each mobile device of at least some of the plurality of mobile devices, the wireless context of the mobile device comprises a wireless Personal Area Network (PAN) context of the mobile device comprising information identifying one or more PAN-enabled devices detected by the mobile device and a quality metric for each of the one or more PAN-enabled devices detected by the mobile device; and
  form one or more crowds of users based on the wireless contexts of the plurality of mobile devices.

33. A computing device comprising:
  a communication interface communicatively coupled to a network; and
  a controller associated with the communication interface and adapted to:
    obtain, via the network, wireless contexts of a plurality of mobile devices of a corresponding plurality of users, wherein for each mobile device of at least some of the plurality of mobile devices, the wireless context of the mobile device comprises a wireless Local Area Network (LAN) context of the mobile device comprising a quality metric for each wireless LAN of the one or more wireless LANs detected by the mobile device; and
    form one or more crowds of users based on the wireless contexts of the plurality of mobile devices.

34. A non-transitory computer readable medium storing software for instructing a controller of a computing device to:
  obtain wireless contexts of a plurality of mobile devices of a corresponding plurality of users, wherein for each mobile device of at least some of the plurality of mobile devices, the wireless context of the mobile device comprises a wireless Local Area Network (LAN) context of the mobile device comprising a quality metric for each wireless LAN of the one or more wireless LANs detected by the mobile device; and
  form one or more crowds of users based on the wireless contexts of the plurality of mobile devices.

* * * * *